United States Patent
Dalton et al.

(10) Patent No.: US 6,361,717 B1
(45) Date of Patent: Mar. 26, 2002

(54) STERICALLY STABILIZED SECOND-ORDER NONLINEAR OPTICAL CHROMOPHORES AND DEVICES INCORPORATING THE SAME

(75) Inventors: Larry R. Dalton, Bainbridge Island, WA (US); Cheng Zhang; Chuanguang Wang, both of Los Angeles, CA (US); Harold R. Fetterman, Pacific Palisades, CA (US); Fang Wang, Highland Park, NJ (US); William Steier, San Marino, CA (US); Aaron W. Harper, Monterey Park, CA (US); Albert S. Ren, Los Angeles, CA (US); Joseph Michael, Los Angeles, CA (US)

(73) Assignee: Pacific Wave Industries, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,422

(22) Filed: Jan. 20, 2000

Related U.S. Application Data

(63) Continuation-in-part of application No. 09/122,806, filed on Jul. 27, 1998, now Pat. No. 6,067,186.

(51) Int. Cl.[7] .............................. G02F 1/35; F21V 9/00
(52) U.S. Cl. ...................................... 252/582; 359/328
(58) Field of Search ........................... 252/582; 359/328

(56) References Cited

U.S. PATENT DOCUMENTS

| | | | | |
|---|---|---|---|---|
| 5,079,321 A | | 1/1992 | Sperling et al. | ............ 526/311 |
| 5,156,774 A | * | 10/1992 | Leising | ........................ 252/582 |
| 5,196,147 A | * | 3/1993 | Taketani et al. | ............ 252/582 |

(List continued on next page.)

OTHER PUBLICATIONS

L. R. Dalton et al., "From molecules to opto–chips: organic electro–optic materials," *J. Mater. Chem.*, 1999, 9, 1905–1920.

N. Nemoto et al., "Novel Types of Polyesters Containing Second–Order Nonlinear Optically Active Chromophores with High Density," *Macromolecules 1996*, 29, 2365–2371.

Z. Sekkat et al., "Room–Temperature Photoinduced poling and Thermal Poling of a Rigid Main–Chain Polymer with Polar Azo Dyes in the Side Chain," *Chem. Mater. 1995*, 7, 142–147.

(List continued on next page.)

*Primary Examiner*—Philip Tucker
(74) *Attorney, Agent, or Firm*—Henricks, Slavin & Holmes LLP

(57) ABSTRACT

Sterically stabilized second-order nonlinear optical chromophores and devices incorporating the same are embodied in a variety of chromophore materials. An exemplary preferred chromophore includes an electron donor group, an electron acceptor group and a bridge structure therebetween, with the electron acceptor group being double bonded to the bridge structure. In a preferred embodiment, the bridge structure also includes at least one bulky side group. Another exemplary preferred chromophore includes an electron donor group, an electron acceptor group and a ring-locked bridge structure between the electron donor group and the electron acceptor group. The bridge structure comprises, for example, two protected alicyclic rings or ring-locked trienone. Another exemplary preferred chromophore includes an electron donor group, a ring-locked tricyano electron acceptor group, and a bridge structure therebetween. In a preferred embodiment, the electron acceptor group comprises an isophorone structure.

21 Claims, 19 Drawing Sheets

| Chromophores | $\lambda_{max}$ in dioxane (nm) | $\lambda_{max}$ in chloroform (nm) |
|---|---|---|
| CLD-72 | 640 | 705 |
| CLD-7 | 646 | 715 |
| CLD-2 | 629.8 | 662.6 |
| CLD-1 | 632.4 | 692.2 |
| CLD-8 | 637 | 689 |
| CLD-6 | 631 | 676 |

U.S. PATENT DOCUMENTS

| | | | | |
|---|---|---|---|---|
| 5,290,630 A | | 3/1994 | Devonald et al. | 428/333 |
| 5,432,286 A | * | 7/1995 | Cabrera et al. | 359/326 |
| 5,514,799 A | * | 5/1996 | Varanasi et al. | 252/582 |
| 5,535,048 A | * | 7/1996 | Mignani et al. | 359/326 |
| 5,549,853 A | | 8/1996 | Beckmann et al. | 252/582 |
| 5,663,308 A | | 9/1997 | Gibbons et al. | 534/573 |
| 5,670,603 A | | 9/1997 | Wu et al. | 528/190 |
| 5,676,884 A | * | 10/1997 | Tiers et al. | 252/582 |
| 5,679,763 A | * | 10/1997 | Jen et al. | 252/582 |
| 5,688,906 A | | 11/1997 | Jen et al. | 528/353 |
| 5,697,744 A | | 12/1997 | Medal | 411/82 |
| 5,698,134 A | | 12/1997 | Jubb et al. | 252/299.01 |
| 5,714,304 A | | 2/1998 | Gibbons et al. | 430/270.11 |
| 5,718,845 A | * | 2/1998 | Drost et al. | 252/582 |
| 5,738,806 A | * | 4/1998 | Beckmann et al. | 252/582 |
| 5,783,306 A | | 7/1998 | Therien et al. | 428/411.1 |
| 5,804,101 A | * | 9/1998 | Marder et al. | 252/582 |
| 5,846,638 A | | 12/1998 | Meissnet | 428/220 |
| 5,854,866 A | | 12/1998 | Leonard | 385/39 |
| 5,882,785 A | | 3/1999 | Hollins et al. | 428/333 |
| 5,883,259 A | | 3/1999 | Kim et al. | 548/224 |
| 5,887,116 A | | 3/1999 | Grote | 385/2 |
| 5,889,131 A | | 3/1999 | Kim et al. | 526/262 |
| 5,892,859 A | | 4/1999 | Grote | 385/2 |

OTHER PUBLICATIONS

S. Yokoyama et al., "Second harmonic generation of dipolar dendrons in the assembled thin films," *Thin Solid Films* 331 (1998) 248–253.

C. Zhang et al., "Chromophore Incorporating Fluorinated Aromatic Polyester for Electro–optic Applications," *Polymer Preprints* 40(2) Aug. 1999.

Y. Zhang et al., "A new hyperbranched polymer with polar chromophores for nonlinear optics" *Polymer* (1997), 38(12), 2893–2897.

D. G. Girton, et al., "20 GHz electro–optic polymer Mach–Zehnder modulator", *Applied Physics Letters*, vol. 58, No. 16, pp. 1730–1732 (1991).

D. M. Burland, et al., "Second–Order Nonlinearity in Poled–Polymer Systems", *Chemical Reviews,*, vol. 94, pp. 31–75 (1994).

S. Kalluri, "Improved poling and thermal stability of sol–gel nonlinear optical polymers"*Applied Physics Letters*, vol. 65, No. 21, pp. 2651–2653 (1994).

I. Cabrere, et al., "A New Class of Planar–Locked Polyene Dyes for Nonlinear Optics", *Advanced Materials*, vol. 6, pp. 43–45 (1994).

W. Wang, "40–GHz Polymer Electrooptic Phase Modulators", *IEEE Photonics Technology Letters*, vol. 7, No. 6, pp. 638–640 (1995).

L. R. Dalton, et al., "Sythesis and Processing of Improved Organic Second–Order Nonlinear Optical Materials for Applications in Photonics", *Chemistry of Materials*, vol. 7, pp. 1060–1081 (1995).

S. Kalluri, "Monolithic Integration of Waveguide Polymer Electrooptic Modulators on VLSI Circuitry", *IEEE Photonics Technology Letters*, vol. 8, No. 5, pp. 644–646 (1996).

Y. Shi, et al., "Fabrication and Characterization of High–Speed Polyurethane–Disperse REd 19 Integrated Electrooptic Modulators for Analog System Applications", *IEEE Journal of Selected Topics in Quantum Electronics*, vol. 2, No. 2, pp. 289–299 (1996).

C. Shu, et al., "Synthesis of second–order nonlinear optical chromophores with enhanced thermal stability: a conformation–locked trans–polyene approach", *Chemical Communication*, pp. 2279–2280 (1996).

A. Chen, "Optimized Oxygen Plasma Etching of Polyurethane–Based Electro-optic Polymer for Low Loss Optical Waveguide Fabrication", *Journal of Electrochemical Society*, vol. 143, No. 11, pp. 3648–3651 (1996).

D. X. Zhu, "Noncollinear four–wave mixing in a broad area semiconductor optical amplifier", *Applied Physics Letters*, vol. 70, No. 16, pp. 2082–2084 (1997).

D. Chen, "Demonstration of 110GHz eletro–optic polymer modulators", *Applied Physics Letters*, vol. 70, No. 25, pp. 3335–3337 (1997).

L. Dalton, "Polymeric electro–optic modulators", *Chemistry & Industry*, pp. 510–514 (1997).

S. Ermer, "Synthesis and Nonlinearity of Triene Chromophores Containing the Cyclohexen Ring Structure", *Chemistry of Materials*, vol. 9, pp. 1437–1442 (1997).

A. Harper, et al., "Translating microscopic optical nonlinearity into macroscopic optical nonlinearity: the role of chromophore–chromophore electrostatic interactions", *Journal of Optical Society of America*: B, vol. 15, No. 1, pp. 329–337 (1998).

A. Chen, et al., "Low–$V_\pi$ electro–optic modular with a high–$\mu\beta$ chromophore and a constant–bias field", *Optics Letters*, vol. 23, No. 6, pp. 478–480 (1998).

C. Shu, et al., Nonlinear Optical Chromophores with Configuration–Locked Polyenes Possessing Enhanced Thermal Stability and Chemical Stability, *Chemistry of Materials*, vol. 10, pp. 3284–3286 (1998).

* cited by examiner

| Chromophores | $\lambda_{max}$ in dioxane (nm) | $\lambda_{max}$ in chloroform (nm) |
|---|---|---|
|  CLD-72 | 640 | 705 |
|  CLD-7 | 646 | 715 |
|  CLD-2 | 629.8 | 662.6 |
|  CLD-1 | 632.4 | 692.2 |
|  CLD-8 | 637 | 689 |
|  CLD-6 | 631 | 676 |

| Chromophores | λ_max in dioxane (nm) | λ_max in chloroform (nm) |
|---|---|---|
| CLD-11 | 648 | 709 |
| CLD-5 | 628.4 | 660.8 |
| CLD-4 | 633.8 | 689.2 |
| CLD-10 | 633 | 672 |
| CLD-9 | 613 | 653 |

Synthesis, thermal and optical properties

M.W.: 717.06 for $C_{44}H_{52}N_4OS_2$
M.P.: 187 °C
Td: 412 °C (by TGA, 4°C/min)
UV-vis: 608 nm in chloroform
556 nm in dioxane

TCF          TCFO          TCCPO

TCI          TCP          TCCP

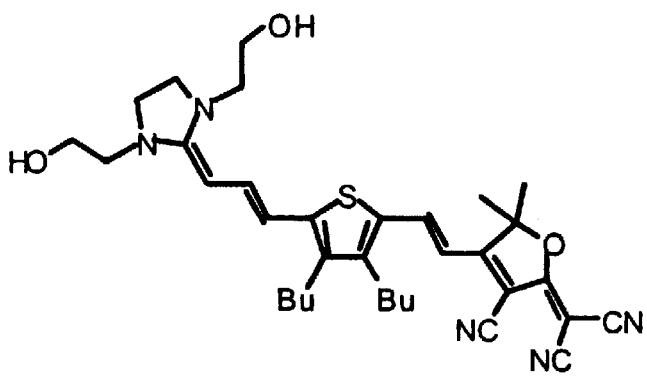
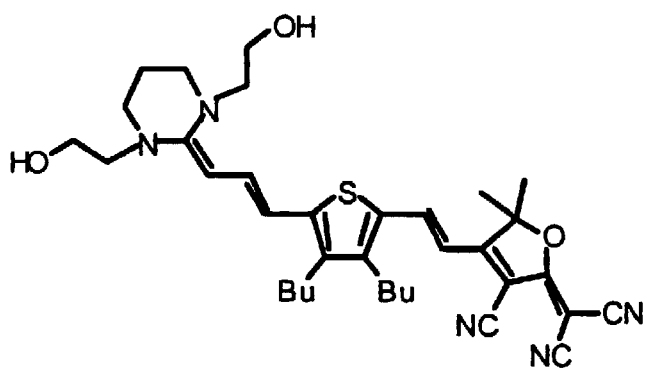
*FIG. 14A*
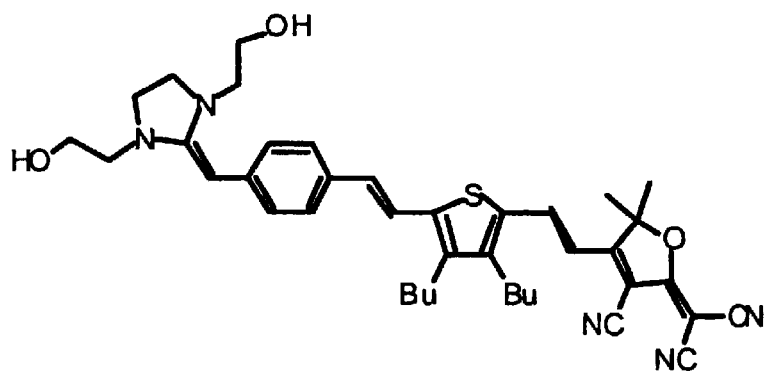
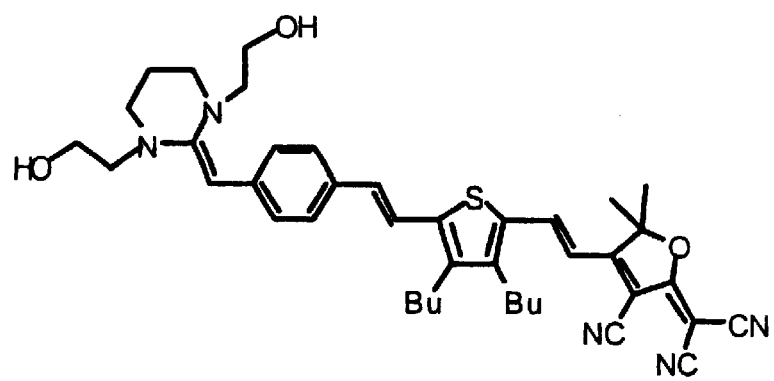

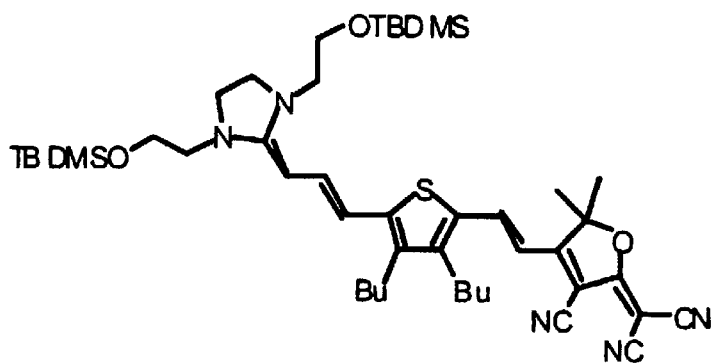
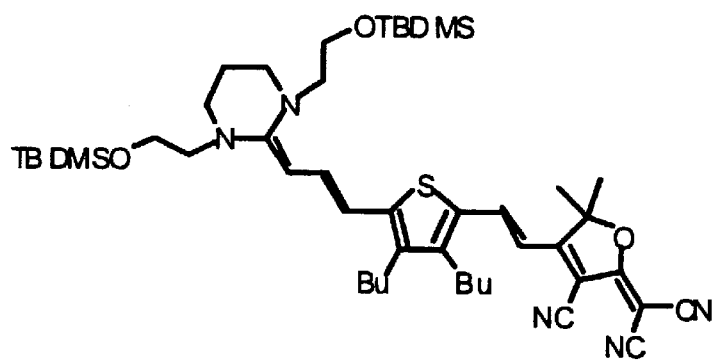
FIG. 14B
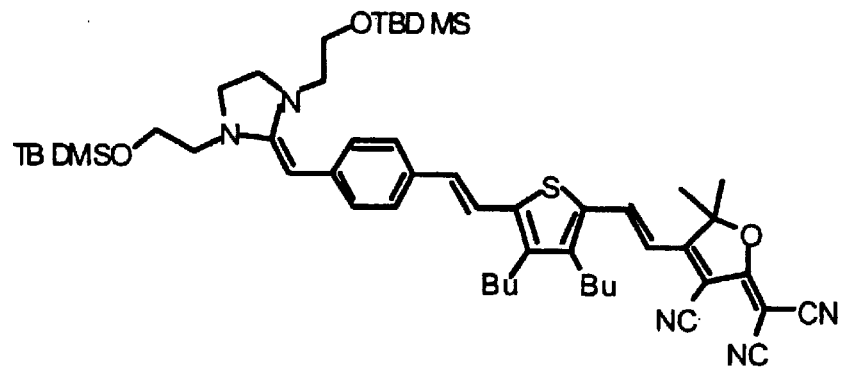
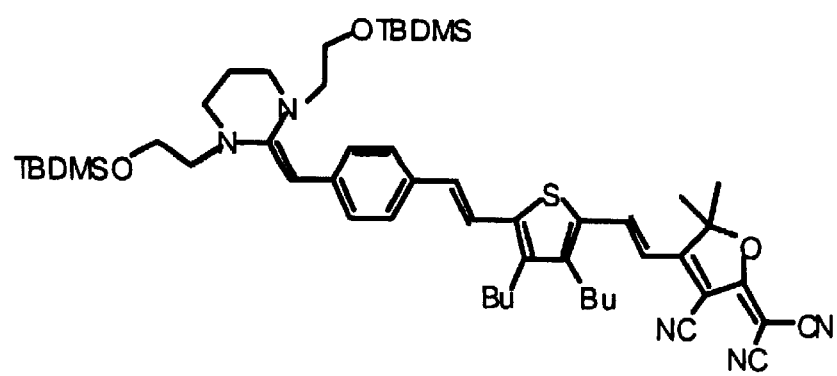

STERICALLY STABILIZED SECOND-ORDER NONLINEAR OPTICAL CHROMOPHORES AND DEVICES INCORPORATING THE SAME

CROSS-REFERENCE TO RELATED APPLICATIONS

This application is a continuation-in-part of U.S. patent application Ser. No. 09/122,806 entitled "New Class of High Hyperpolarizability Organic Chromophores and Process for Synthesizing the Same" filed on Jul. 27, 1998, now U.S. Pat. No. 6,067,186.

STATEMENT REGARDING FEDERALLY SPONSORED RESEARCH AND DEVELOPMENT

This invention was made with support from the government of the United States of America under Contracts F49620-97-C-0064, F49620-97-1-0307, F49620-97-1-0491, F49620-97-C-0064, F49620-98-C-0059, F49620-98-C-0077, F49620-99-0040 awarded by the United States Air Force. The government of the United States of America has certain rights in this invention as provided by these contracts.

BACKGROUND OF THE INVENTION

1. Field of the Invention

The present invention relates to nonlinear optical chromophores and, more particularly, pertains to sterically stabilized second-order nonlinear optical chromophores and devices incorporating the same.

2. Description of the Related Art

Organic second-order nonlinear optical (NLO) materials have received increasing attention for applications involving signal processing and telecommunications. One of the challenges in this field is to design and synthesize second-order NLO chromophores (the active components of second-order nonlinear optical materials) that simultaneously possess large first molecular hyperpolarizabilities ($\beta$), good chemical and thermal stability, and optical transparency at optical communication wavelengths (1.3 and 1.55 $\mu$m). Chromophore intermolecular electrostatic interactions prevent the simple scaling of molecular optical nonlinearity into macroscopic optical nonlinearity. Such interactions strongly attenuate the efficient induction of acentric chromophore order (hence, electrooptic activity) by electric field poling or self-assembly methods. Chromophores with $\beta$ values many times those of the well-known Disperse Red 19 dye are thus required to obtain electrooptic coefficients comparable to or higher than those of the leading commercial material crystalline lithium niobate.

The value of $\beta$ for a chromophore can be increased by using a diene moiety in place of thiophene in the conventional phenylethenylenethiophene $\pi$-conjugated bridge. Moreover, this enhancement in $\beta$ can be accomplished without an increase in the wavelength of the charge-transfer absorption $\lambda_{max}$. However, the resulting phenylpolyene bridge has poor thermal stability unless the polyene structure is sterically protected. The synthesis of various sterically-protected (ring-locked) phenylpolyene chromophores involves cyclic enones such as isophorone, verbenone and double-ring locked dienone as starting materials and intermediates. The Knovenegal coupling reaction between enones and electron acceptors is the critical step in both backward and forward methods reported. The low reactivity of enone severely limits the choice of acceptor to only a few molecules including malononitrile, isoxazolone, and thiobarbituric acid and therefore has become the bottleneck in the development of ring-locked phenylpolyene-bridged high $\beta$ chromophores.

SUMMARY OF THE INVENTION

A new class of ring-locked aminophenylpolyenal donor-bridges has been developed. These new donor-bridges, according to the present invention, have very high Knovenegal reactivity and have been coupled with a variety of acceptors bearing acidic methyl or methylene groups (including the most desired TCF and TCI type of acceptors shown in FIG. 11) to obtain a new class of second-order NLO chromophores. This methodology broadens the scope of polyene-bridged chromophores without significantly sacrificing thermal stability or optical transparency. This synthetic approach leads to the development of device-quality NLO chromophores (shown in FIG. 1) possessing $\mu\beta$ values (where $\mu$ is the chromophore dipole moment) of $15,000 \times 10^{-48}$ esu or greater at 1.9 $\mu$m as determined by the electric field induced second harmonic generation (EFISH) technique.

A variety of different molecular structures are possible for the chromophores of the present invention. An exemplary preferred chromophore according to the present invention includes an electron donor group, an electron acceptor group and a bridge structure therebetween, with the electron acceptor group being double bonded to the bridge structure. In a preferred embodiment, the bridge structure also includes at least one bulky side group.

Another exemplary preferred chromophore according to the present invention includes an electron donor group, an electron acceptor group and a ring-locked bridge structure between the electron donor group and the electron acceptor group. The bridge structure comprises, for example, two protected alicyclic rings or ring-locked trienone.

Another exemplary preferred chromophore according to the present invention includes an electron donor group, a ring-locked tricyano electron acceptor group, and a bridge structure therebetween. In a preferred embodiment, the electron acceptor group comprises an isophorone structure.

Another exemplary preferred chromophore according to the present invention includes an electron donor group, an electron acceptor group, and a bridge structure therebetween, with the bridge structure including a bithiophene unit. In a preferred embodiment, the bridge structure further includes a modified isophorone unit.

The NLO materials of the present invention are suitable for a wide range of devices. Functions performed by these devices include, but are not limited to, the following: electrical to optical signal transduction; radio wave to millimeter wave electromagnetic radiation (signal) detection; radio wave to millimeter wave signal generation (broadcasting); optical and millimeter wave beam steering; and signal processing such as analog to digital conversion, ultrafast of signals at nodes of optical networks, and highly precise phase control of optical and millimeter wave signals.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 4 illustrates exemplary preferred CLD chromophores with alkyl derivative at the middle ring;

FIGS. 14A and 14B illustrate exemplary preferred FTC chromophores with modified donor structures according to the present invention;

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

This application is a continuation-in-part of U.S. patent application Ser. No. 09/122,806 entitled "New Class of High Hyperpolarizability Organic Chromophores and Process for Synthesizing the Same" filed on Jul. 27, 1998, the disclosure of which is incorporated herein by reference in its entirety.

Figure 1:
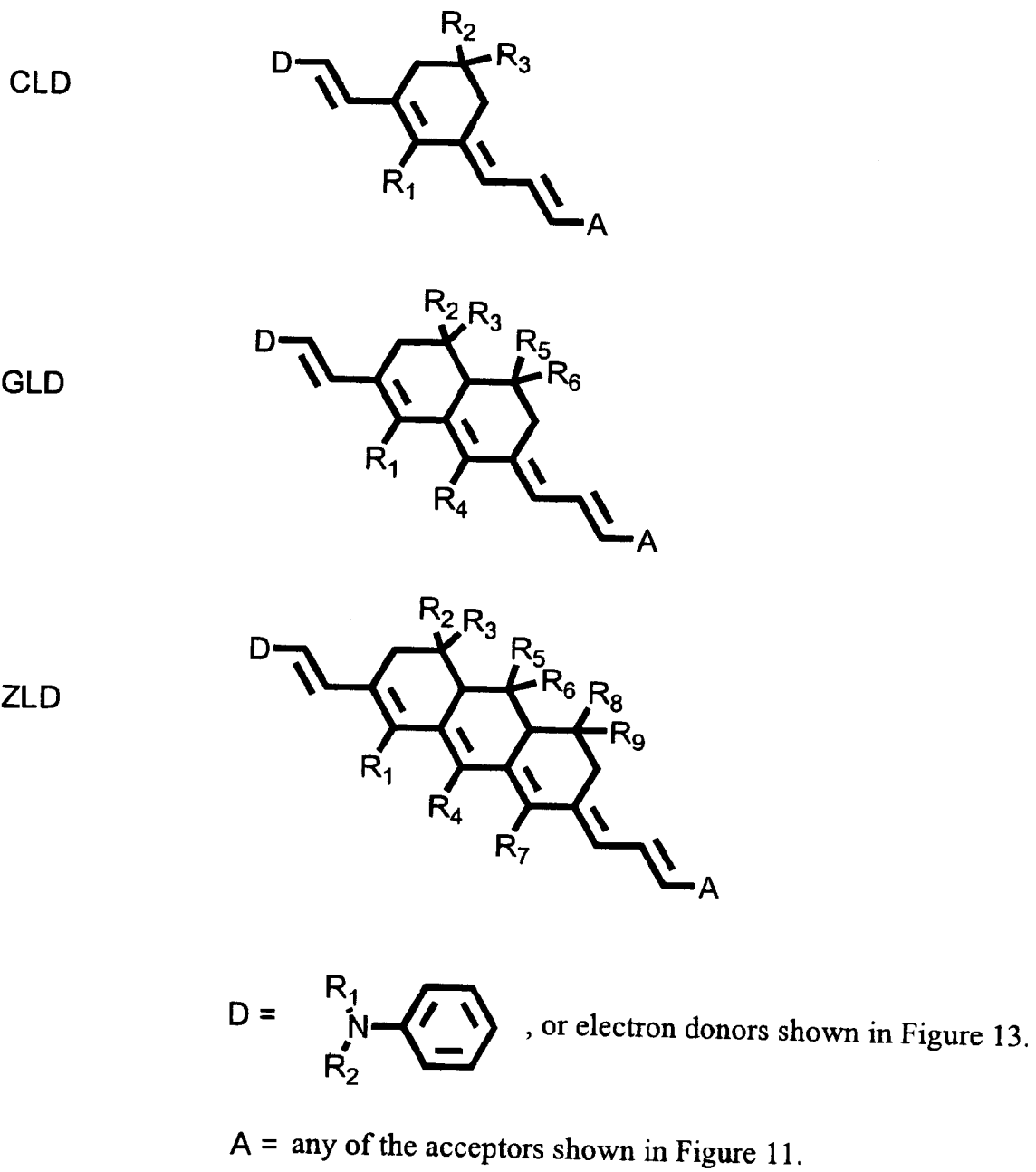
FIG. 1 illustrates the basic structure of CLD, GLD and ZLD chromophores according to the present invention.

Referring to FIG. 1, three molecular chromophore structures according to the present invention are identified by their abbreviated names: CLD, GLD and ZLD. Each chromophore includes an electron donor group ("D"), an electron acceptor group ("A") and a bridge structure therebetween. As shown in FIG. 1, in the exemplary preferred chromophores, the electron acceptor group is connected to the ring-locked polyene bridge structure with a conjugated diene. See, C. Zhang, A. S. Ren, F. Wang, J. Zhu, L. Dalton, "Synthesis and Characterization of Sterically Stabiliized Second-Order Nonlinear Optical Chromophores", *Chem. Mater.* 1999, 11, 1966–1968, which is incorporated herein by reference. Within the scope of the present invention, it is also contemplated that the electron donor group can be double bonded to the bridge structure.

Figure 13:
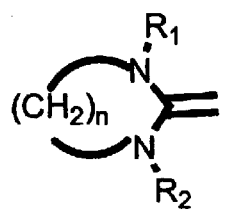
FIG. 13 illustrates exemplary preferred alternative donor structures for the FTC, CLD and GLD chromophores according to the present invention.
Figure 13:
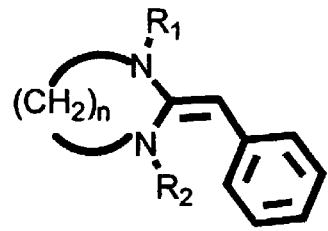

Exemplary preferred structures for the electron donor group are shown in FIGS. 1 and 13. In FIG. 1, $R_1$ to $R_9$=H, $-C_nH_{2n+1}$, n=1-30 including primary, secondary, tertiary and any branched alkyl groups, or any alkyl group with 1–30 carbon atoms functionalized with one or more of the following functional groups: hydroxy, ether, ester, amino, silyl, siloxy.

Figure 11:
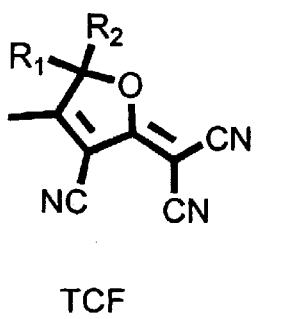
FIG. 11 illustrates exemplary preferred ring-locked tricyano electron acceptors for the chromophores according to the present invention.
Figure 11:
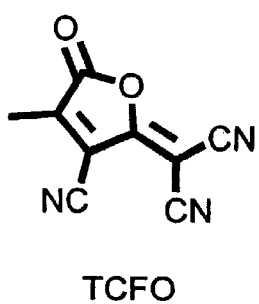
Figure 11:
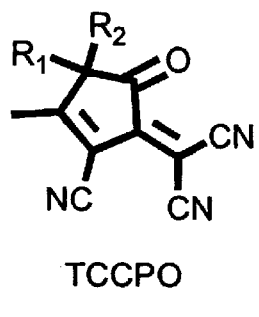
Figure 11:
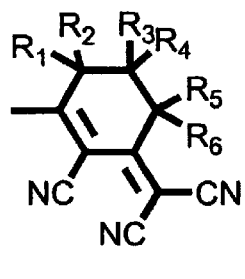
Figure 11:
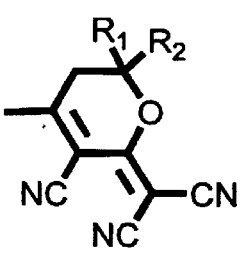
Figure 11:
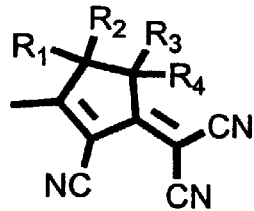

Exemplary preferred structures for the electron acceptor group are shown in FIG. 11. The electron acceptor groups preferably have five-member or six-member rings. However, rings with seven or more members can also be employed.

Generally, it has been observed that dipole moment and molecular hyperpolarizability increase from CLD to ZLD. Final device performance (electrooptic activity) is related to the product of dipole moment and hyperpolarizability. A corresponding increase in electrooptic activity over this series has also been observed. For example, for measurements carried out at 1.06 microns wavelength, the following electrooptic activities coefficients were observed: 55 pm/V (FTC), 85 pm/V (CLD), 110 pm/V (GLD). These values were obtained for the low dielectric polymer matrix poly-(methylmethacrylate), PMMA. Somewhat larger electrooptic coefficients were observed in polymer matrices (e.g., amorphous poly(carbonate), APC) of higher dielectric constant.

Figure 2:
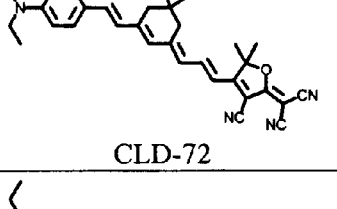
FIG. 2 illustrates exemplary preferred CLD chromophores according to the present invention.
Figure 2:
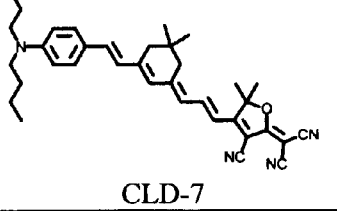
Figure 2:
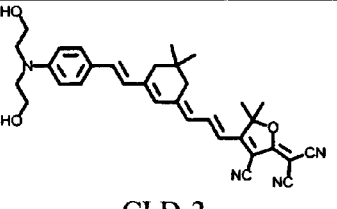
Figure 2:
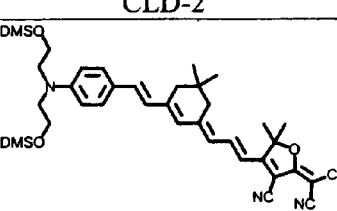
Figure 2:
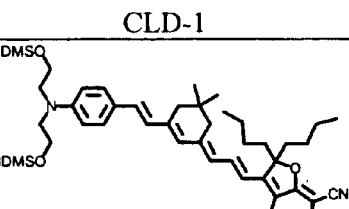
Figure 2:
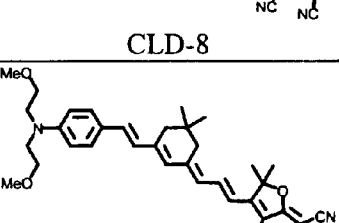

A large number of variations of the CLD, GLD and ZLD structures have been synthesized, characterized, and utilized in the fabrication of prototype devices by modifying the starting materials in the general synthetic schemes presented herein and in U.S. patent application Ser. No. 09/122,806. Exemplary preferred CLD chromophores are shown in FIG. 2.

Synthesis of CLD Chromophore

Figure 3:
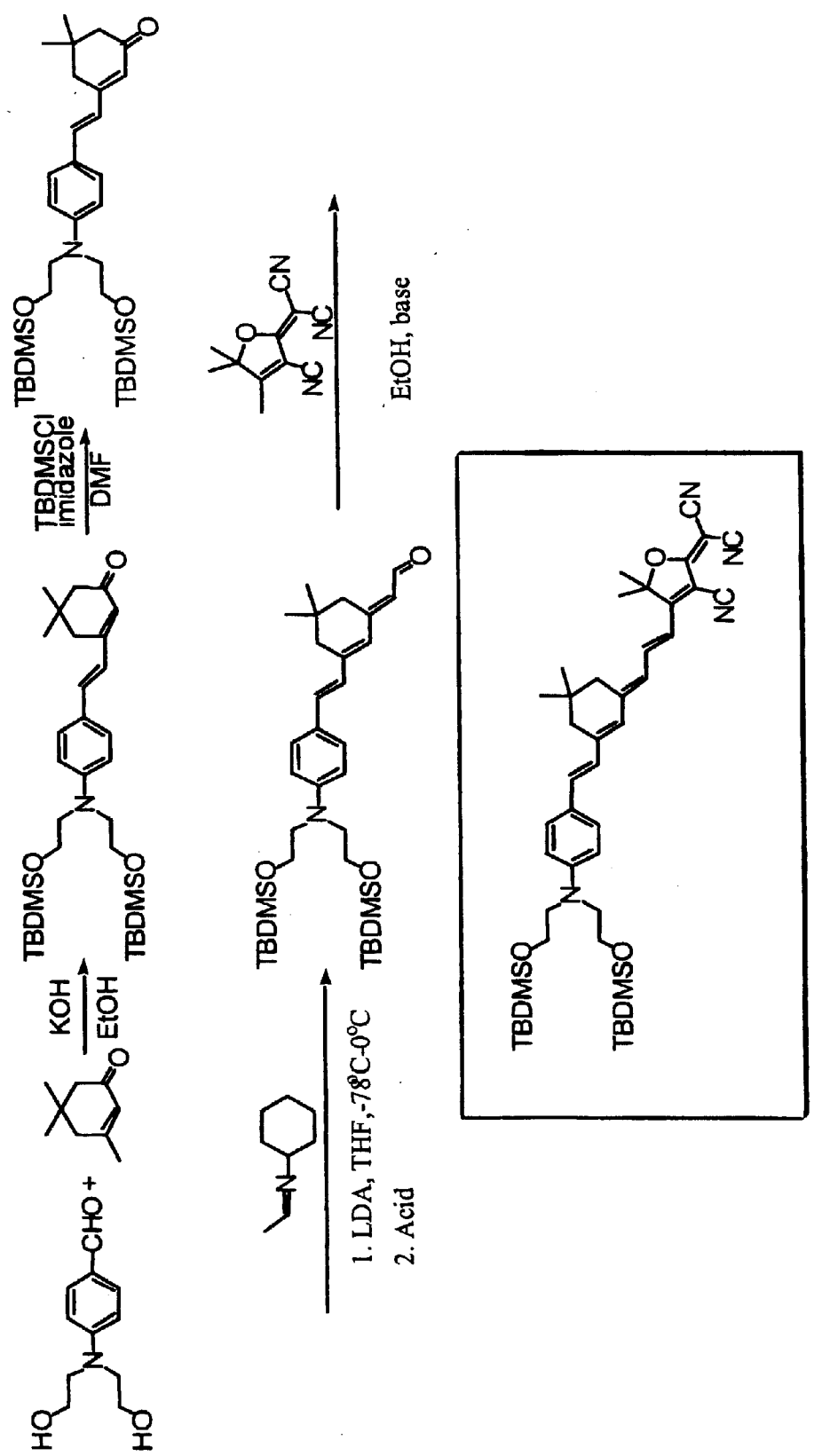
FIG. 3 illustrates an exemplary preferred method according to the present invention for synthesizing a CLD chromophore.

Referring to FIG. 3, an exemplary preferred method for synthesizing CLD is illustrated. The exemplary preferred method for synthesis is described below.

A mixture of 1.815 mol of p-N,N-bis(2-hydroxyethyl) aminobenzaldehyde, 2.178 mol, 301 g of isophorone, 1 L of EtOH, and 2.1 mol of sodium ethoxide was stirred at 50° C. for 15 h. The reaction was stopped by adding 50 g of water. Ethanol was evaporated in vacuo and product crystallized out. The product was collected by filtration, washed with water. It was vacuumed to remove water and then recrystallized from EtOAc to give 90% yield. Mass: 329.200, found 329.199.

TBDMS protection: A mixture of 45.4 g, 138 mol of the above product, 80 g DMF, 42 g imidazole and 46 g t-butyldimethylsilyl chloride was stirred at 60° C. for 6 h. The mixture was then poured to water and extracted with hexane. The extract was condensed and the residual was purified by column chromatography to give 72.7 g product: 94.5% yield. Crystals from hexane had a melting point of 106.5–108° C. Elemental analysis: calc. C, 68.88; H, 9.94; N, 2.51; Found C, 69.04, H, 9.92; N 2.48.

Extension of ketone to aldehyde: A solution of 110 mmol, 13.77 g of N-cyclohexylacetimine in 35 ml THF was added to 77 ml 1.5M LDA/cyclohexane at −50 C. After the addition the mixture was warmed up with an ice bath and then recooled to −78 C. A solution of 61.35 g of the above ketone in 105 ml THF was added. The mixture was then warm up in air and then acidified with dilute acetic acid solution and stirred at room temperature for 11 h. After usual work up, the crude product was purified by column chromatography to give 26.56 g pure product: 41.6% yield.

CLD-1: A mixture of 10.99 g of above aldehyde, 3.75 g of 2-dicyanomethylene-3-cyano-4,5,5-trimethyl-2,5-dihydrofuran, 110 ml anhydrous EtOH, 0.7 ml of 21 wt % EtONa/EtOH was refluxed for 4 h. The product was collected by filtration and recrystallized from ethanol to give 11.5 g chromophore: 80% yield. Elemental analysis: calcd.: C, 70.63; H, 8.43; N, 7.32. Found: C, 70.66; H, 8.53; N, 7.36. $\lambda_{max}$: 632.4 nm in dioxane, 692.2 nm in $CHCl_3$. Td 274.7° C. by DSC ($N_2$, 10° C./min).

A protonated version is synthesized by removing the TBMDS protecting group. A number of variants of this structure have been synthesized by use of modified starting materials following the general reaction scheme presented above.

Variations to the chromophores have been made to improve electrooptic activity either by sterically inhibiting unwanted intermolecular electrostatic interactions, by improving the electron-withdrawing characteristics of the acceptor end of the chromophores, by improving the electron donating characteristics of the donor end of the chromophore, or by improving electron communication of the bridge segment of the chromophore.

Referring to FIG. 4, a representative example of steric modification of the bridge segment of the CLD chromophore shows the addition of a bulky side group (alkyl derivative at the middle ring) to reduce electrostatic interaction. It should be understood, however, that other side groups can be added. A plurality of bulky side groups, e.g., branched or tertiary side groups, can also be added to each bridge segment.

Synthesis of Sterically Modified CLD Chromophore

Figure 5:
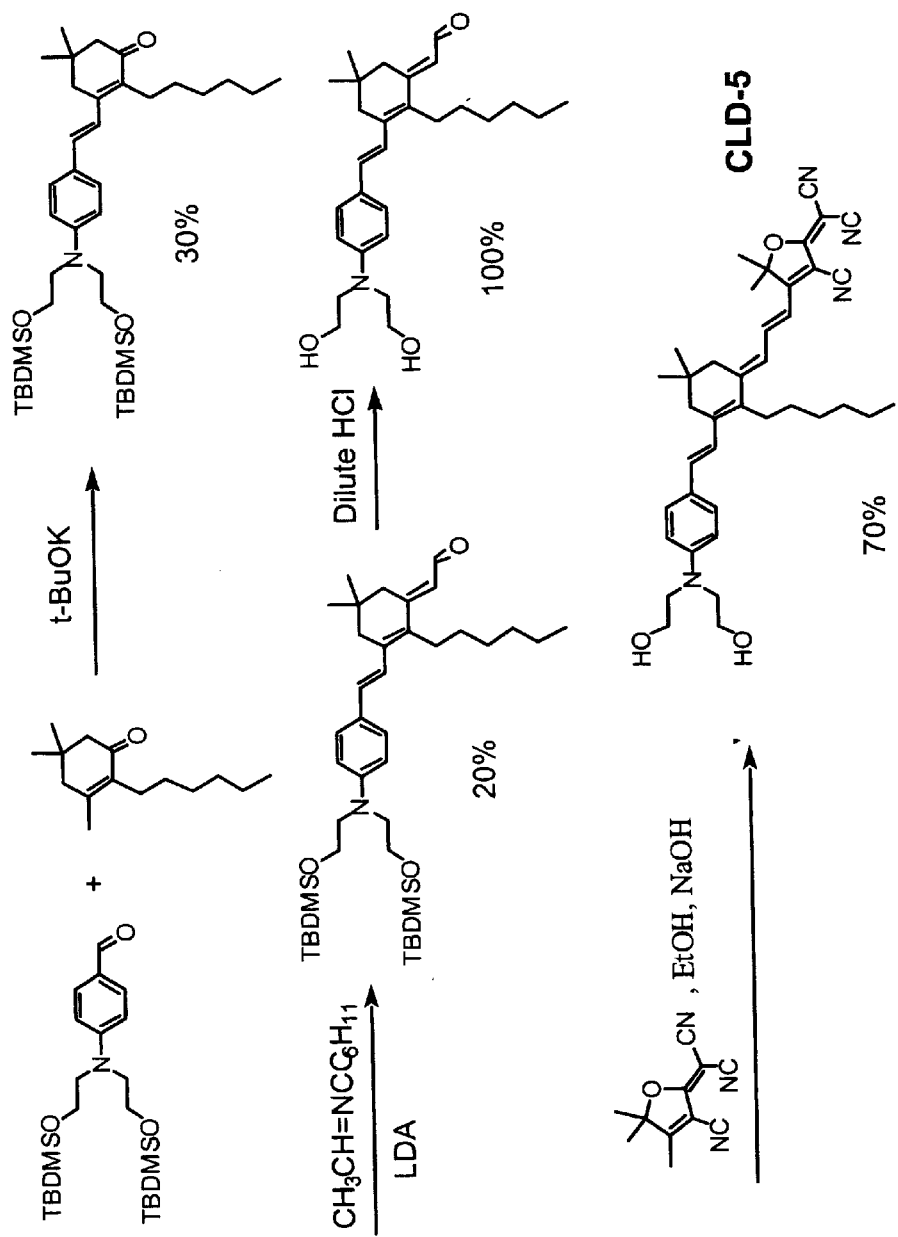
FIG. 5 illustrates an exemplary preferred method according to the present invention for synthesizing a sterically modified CLD chromophore.

An exemplary preferred method for synthesizing a sterically modified CLD chromophore is illustrated in FIG. 5. The exemplary preferred method for synthesis is described below.

2-Hexyl-isophorone

This compound was synthesized according a literature method (Stork, G. Benaim, J. *J. Am. Chem. Soc.* 1971, 5938–5939.) from isophorone in 55% yield. $^1H$ NMR ($CDCl_3$): δ2.29 (t, 6.32 Hz, 2H), 2.23 (s, 2H), 1.92 (s, 2H), 1.30 (m, 8H), 1.00 (s, 6H), 0.88 (t, 6.42 Hz, 3H). $^{13}C$ NMR ($CDCl_3$): δ198.55, 151.93, 134.53, 51.16, 46.75, 32.43, 31.56, 29.25, 28.90, 27.99, 24.80, 22.41, 21.04, 13.88. Anal. Calcd. for $C_{15}H_{26}O_1$: C, 81.02; H, 11.79; Found: C, 81.18; H, 11.87.

3-[p-N,N-Bis(2-t-butyldimethylsiloxyethyl)aminostyryl]-5,5-dimethyl-2-hexyl-cyclohex-2-enone Potassium t-butoxide (30.32 g, 97%, 0.262 mol.) was added to a solution of p-N,N-Bis(2-t-butyldimethylsiloxyethyl)aminobenzaldehyde (, 53.4 g, 0.122 mol.) and 2-hexyl-isophorone (compound 10, 26.6 g, 0.118 mol.) in diglyme (200 mL, KOH dried) over 3 min. Ice bath was used to keep the temperature below 50° C. The reaction mixture was stirred at room temperature for 25 min. and then was poured to dilute acetic acid (0.28 mol HOAc in 200 mL of water). The extra acid was neutralized saturated aqueous sodium bicarbonate. The organic layer was separated, washed with water, dried with magnesium sulfate and rotovapped to dryness. The residue was purified by a silica gel column using ethyl acetate/hexane (1/20, v/v) to afford 8.33 g red thick oil: yield 22% based on reacted starting material. Only about starting materials reacted. $^1H$ NMR ($CDCl_3$): δ7.36 (d, 8.81 Hz, 2H), 7.14 (d, 16.06 Hz, 1H), 6.88 (d, 16.09 Hz, 1H), 6.69 (d, 8.91 Hz, 2H), 3.78 (t, 6.06 Hz, 4H), 3.56 (t, 5.89 Hz, 4H), 2.53 (br, 2H), 2.48 (s, 2H), 2.29 (s, 2H), 1.33 (m, 8H), 1.05 (s, 6H), 0.90 (s, 18H), 0.04 (s, 12H) ppm. $^{13}C$ NMR ($CDCl_3$): δ198.87, 148.41, 147.67, 134.47, 134.19, 128.52, 124.38, 121.71, 111.54, 60.21, 53.42, 51.37, 39.82, 32.27, 31.65, 29.90, 29.37, 28.39, 25.79, 24.30, 22.54 ppm.

TBDMS Protected, Hexyl Derivatized Donor-bridge

A solution of lithium diisopropylamine (4.7 mL 1.5M in THF, 7.05 mmol.) in THF (12 mL) was cooled to −20° C. N-cyclohexylacetimine (6.7 mmol.) was added and the mixture was allowed to warm up to 0° C. and was kept at the temperature for 15 min. It was re-cooled to −20° C. and 3-[p-N,N-Bis(2-t-butyldimethylsiloxyethyl)aminostyryl]-5,5-dimethyl-2-hexyl-cyclohex-2-enone (4.31 g, 6.71 mmol., in 15 mL of THF) was added over 3 min. It was stirred for 5 more min. and was stopped by adding 1N acetic acid solution. The product was extracted with hexane and the extract was washed with sodium bicarbonate solution, dried with magnesium sulfate and rotovapped to dryness. The residue was purified by a silica gel column using ethyl acetate/hexane (1/20, v/v) to afford 0.55 g red oil product and recovered 3.45 g starting material. The yield was 61% based on consumed starting ketone. $^1H$ NMR ($CDCl_3$): δ10.13 (d, 8.22 Hz, 1H), 7.33 (d, 8.80 Hz, 2H), 7.15 (d, 15.54 Hz, 1H), 6.77 (d, 16.38 Hz, 1H), 6.68 (d, 9.13 Hz, 2H), 6.20 (d, 7.94 Hz, 1H), 3.78 (t, 5.84 Hz, 4H), 3.55 (t, 5.74 Hz, 4H), 2.68 (s, 2H), 2.52 (br, t, 2H), 2.38 (s, 2H), 1.34 (m, 8H), 1.01 (s, 6H), 0.89 (s, 18H), 0.04 (s, 12H) ppm. $^{13}C$ NMR ($CDCl_3$): δ191.53, 157.46, 148.14, 140.57, 133.16, 132.65, 128.23, 124.87, 123.47, 122.31, 111.59, 60.23, 53.43, 40.40, 39.38, 31.59, 30.15, 29.78, 29.52, 28.22, 27.26, 25.79, 22.57, 18.15, 14.03, −5.47 ppm. Exact mass calcd. for $C_{40}H_{69}N_1O_3Si_2$: 668.493. Found: 668.489.

Chromophore

Above aldehyde (0.55 g, 0.823 mmol.) and 2-dicyanomethylene-3-cyano-4,5,5-trimethyl-2,5-dihydrofuran (0.198 g, 0.988 mmol.) were dissolved in 5 mL of ethanol that contained 7 mg of sodium hydroxide. The solution was refluxed for 3.5 hours and then 10 mL of water was added dropwise to precipitate out the product. The crude product was collected by filtration, washed with water, dried in vacuo, and purified by a silica gel column using ethyl acetate/hexane (1/7 to 1/5, v/v) to give 245 mg pure product: yield 35%. $^1$H NMR (CDCl$_3$): δ8.06 (q, J$_1$=12.02 Hz, J$_2$=14.74 Hz, 1H), 7.36 (d, 8.89 Hz, 2H), 7.22 (d, 16.29 Hz, 1H), 6.88 (d, 15.79 Hz, 1H), 6.70 (8.78 Hz, 2H), 6.63 (d, 12.09 Hz, 1H), 6.35 (d, 14.96 Hz, 1H), 3.78 (t, 5.77 Hz, 4H), 3.57 (d, 5.83 Hz, 1H), 2.61 (br, t, 2H), 2.44 (s, 4H), 1.71 (s, 6H), 1.43 (br, m, 8H), 0.89 (s, 18H), 0.03 (s, 12H) ppm. $^{13}$C NMR (CDCl$_3$): δ176.35, 173.46, 155.48, 148.88, 145.13, 144.08, 135.16, 134.78, 128.94, 124.92, 124.27, 122.39, 115.82, 112.80, 112.06, 111.90, 111.77, 96.78, 93.93, 60.40, 55.68, 53.57, 40.87, 40.71, 31.78, 30.64, 30.18, 29.72, 28.43, 27.25, 26.70, 25.97, 22.76, 18.35, 14.24, −5.28 ppm. Exact mass calculated for C$_{51}$H$_{76}$N$_4$O$_3$Si$_2$: 848.543. Found: 848.546.

In addition to the hexyl variant shown, other linear and branched alkyl derivatives were synthesized and characterized. Also, the methyl groups on the isophorone alicyclic ring were replaced by a variety of longer alkyl groups. Both hydoroxylated (deprotected) and TBDMS protected donor structures were prepared, characterized and utilized.

Synthesis of GLD Chromophore

Figure 6:
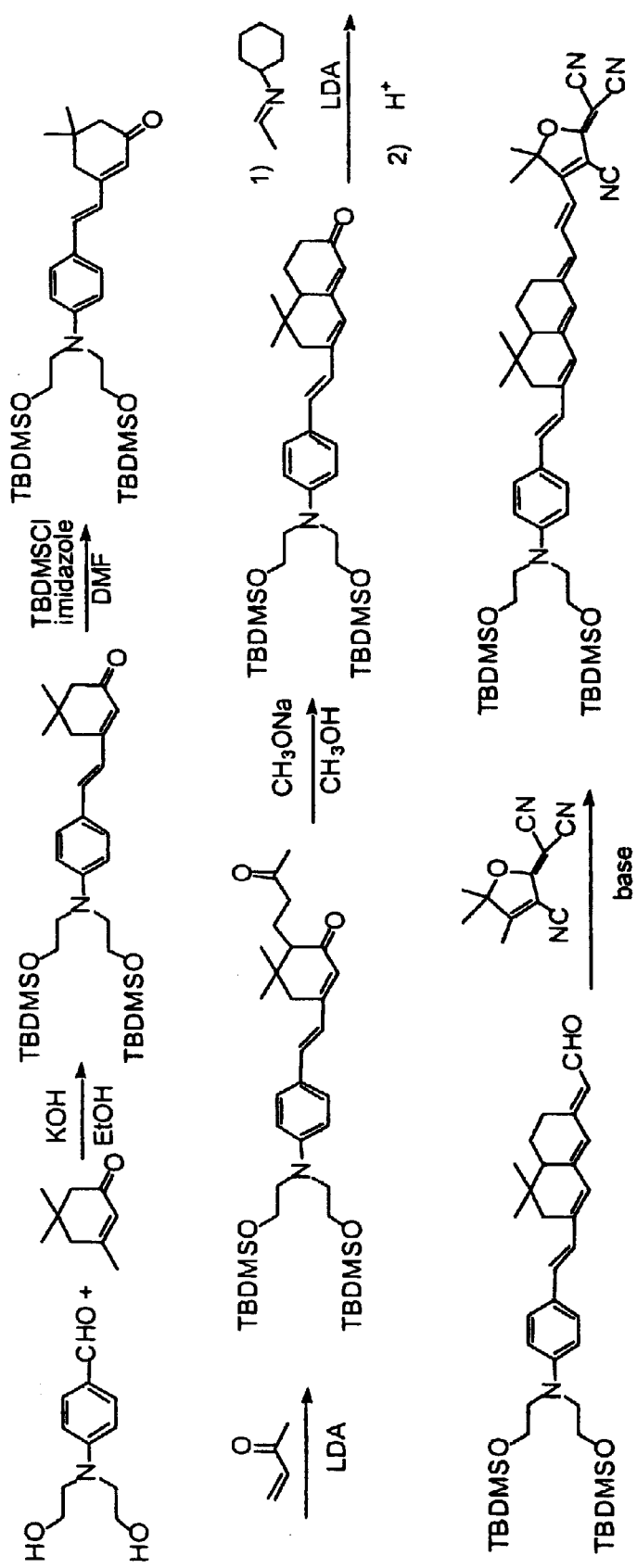
FIG. 6 illustrates an exemplary preferred method according to the present invention for synthesizing a GLD chromophore.

Referring to FIG. 6, an exemplary preferred method for synthesizing the GLD chromophore is illustrated. The exemplary preferred method for synthesis is described below.

The procedure for synthesizing GLD is essentially the same as the CLD synthesis procedure shown in FIG. 3, except that two steps were added to construct the fused ring system. The discussion of FIG. 3 is applicable with respect to the preparation of variants of this theme.

Synthesis of ZLD Chromophore

Figure 7:
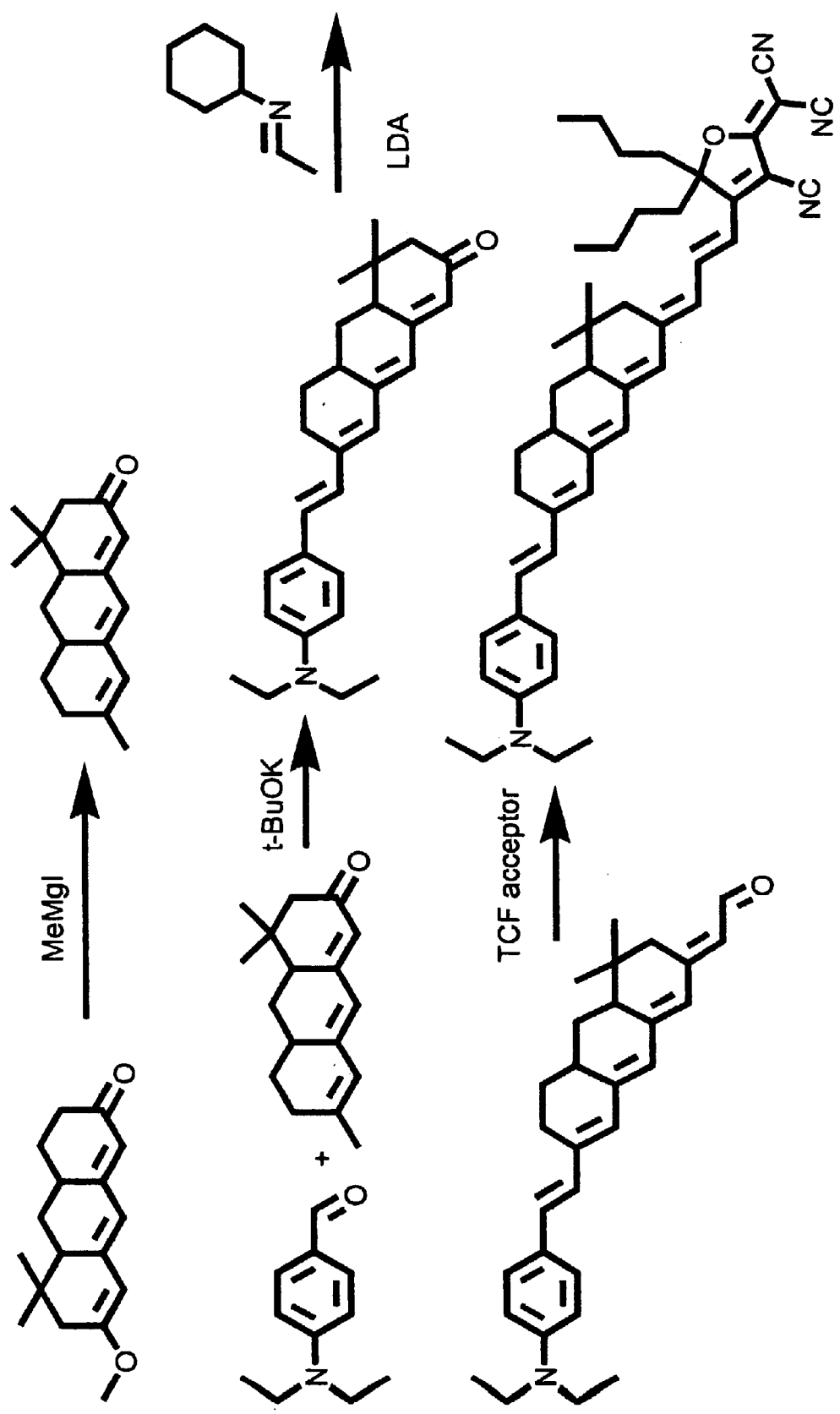
FIG. 7 illustrates an exemplary preferred method according to the present invention for synthesizing a ZLD chromophore.

Referring to FIG. 7, an exemplary preferred method for synthesizing the ZLD chromophore is illustrated. The exemplary preferred method for synthesis is described below.

Synthesis of ring-locked trienone: To a solution of 11 mmol of the starting material (synthesized according C.-F. Shu et al, Chem. Mater. 1998, 10, 3284) in 20 ml of anhydrous THF and 1.3 eq cooled in ice bath, 4.77 ml 3M methylmagnesium bromide ether solution was added over 2 min. After addition, the mixture was refluxed for 30 min. The mixture was acidified with 30 wt % aqueous acetic acid solution and stirred at room temperature overnight. After usual work up, the crude product was purified using to give 1.37 g pure product, yield 52%. Recrystallization from hexane gave orange red crystals with a mp of 135.5–137.5 C. Elemental analysis: Calcd. for C17H22O: C, 84.25; H, 9.15;. Found: C, 83.96, H, 9.25.

The remaining steps are similar to those shown in FIG. 3.

Figure 8:
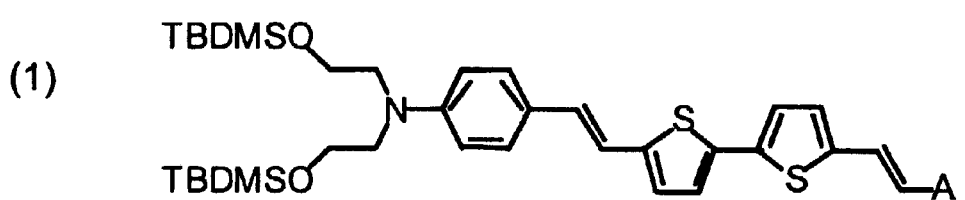
FIG. 8 illustrates exemplary preferred chromophores containing bithiophene units and modified isophorone units according to the present invention.
Figure 8:
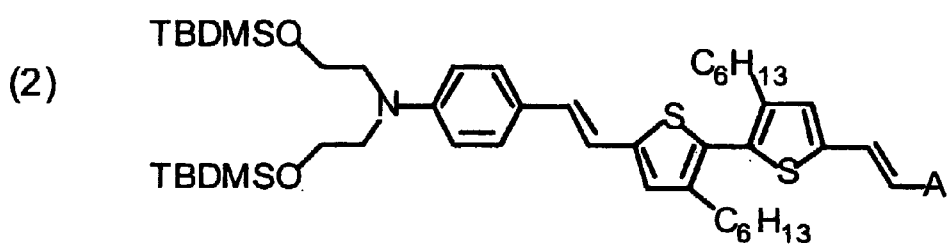
Figure 8:
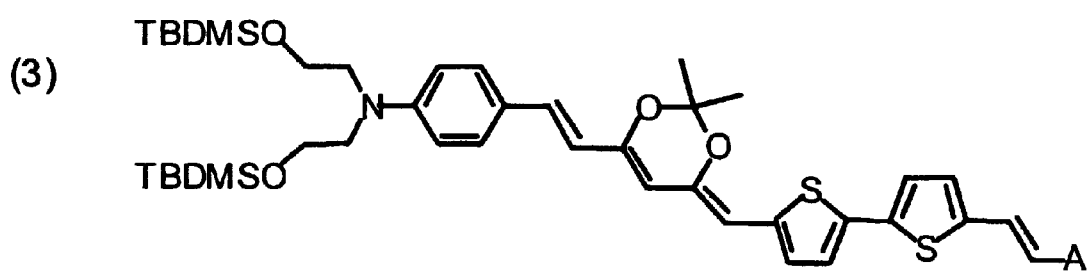
Figure 8:
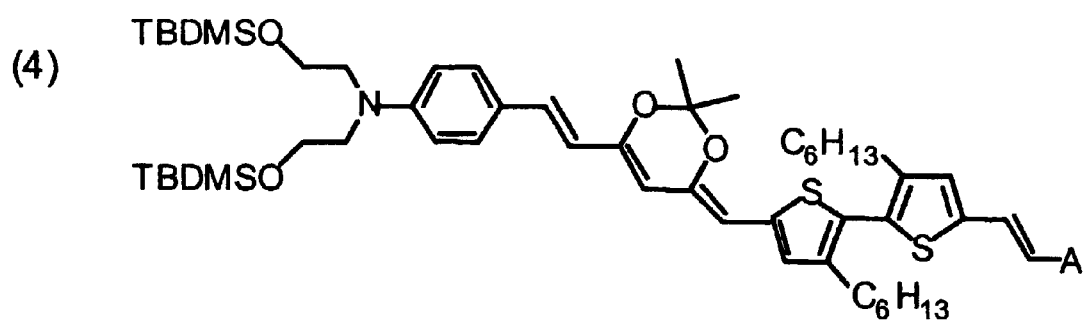
Figure 9A:
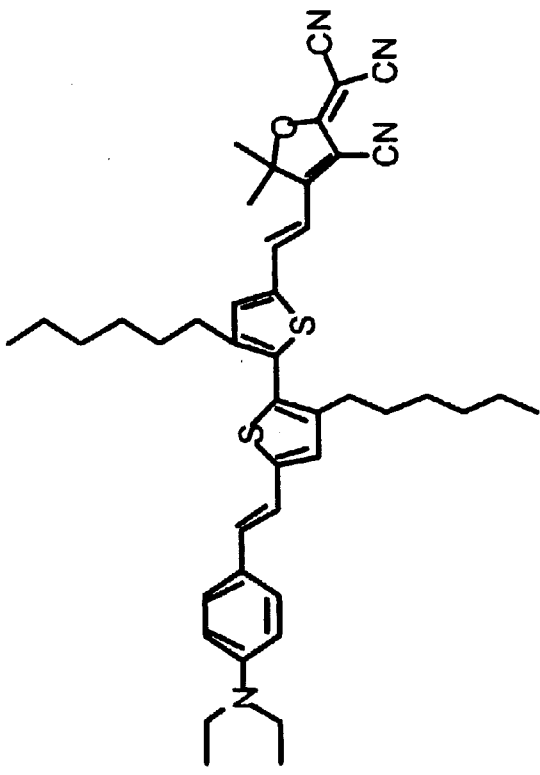
FIG. 9A illustrates the synthesis, thermal, and optical properties of chromophores incorporating bithiophene units according to the present invention.

Referring to FIG. 8, exemplary preferred chromophores according to the present invention include bridge structures which have been modified by the insertion of bithiophene units and modified isophorone units. The synthesis, thermal, and optical properties of chromophores incorporating bithiophene units are shown in FIG. 9A. As illustrated, this modification provides an increased thermal stability characteristic.

Synthesis of Chromophore Incorporating Bithiophene Units

Figure 9B:
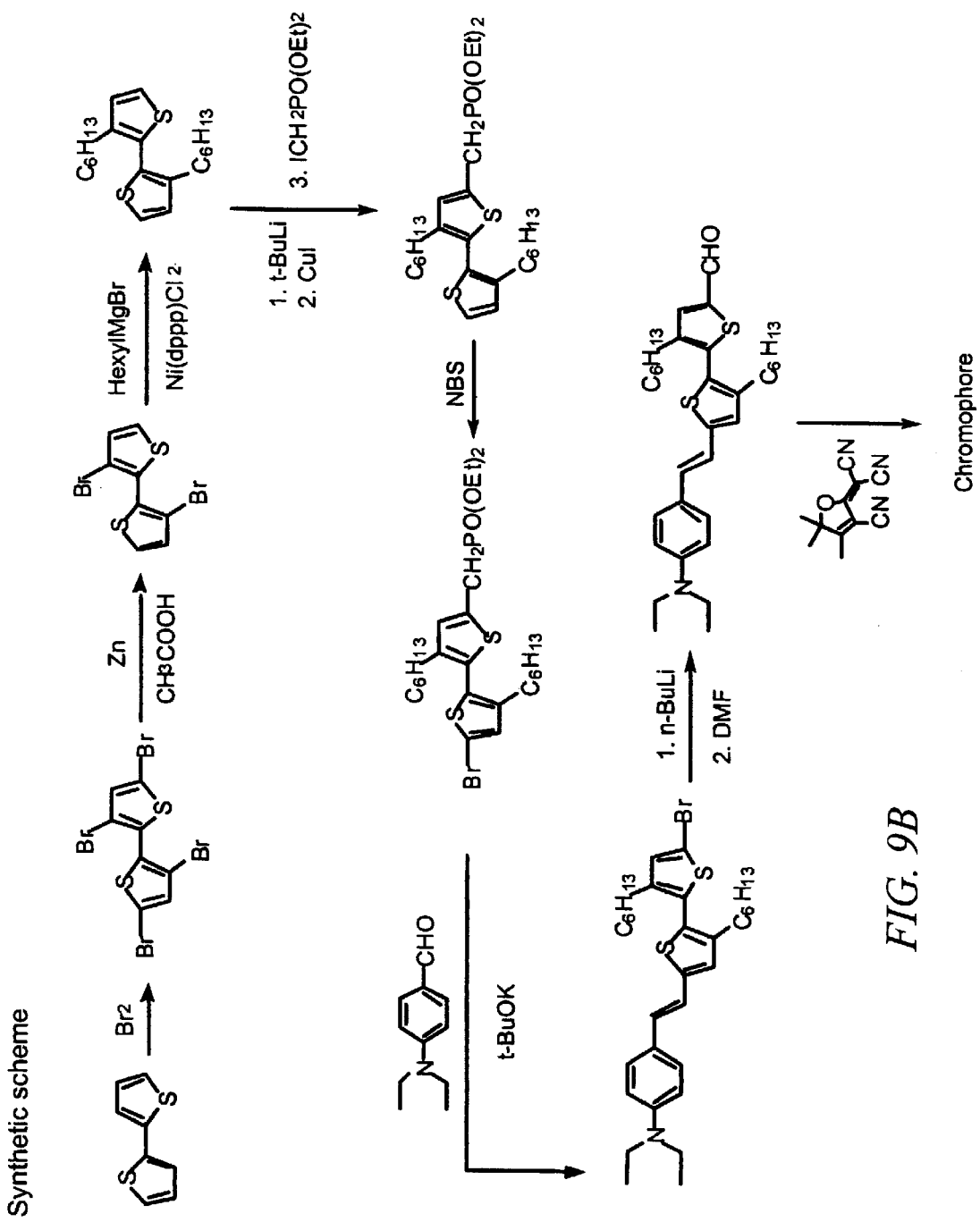
FIG. 9B illustrates an exemplary preferred synthetic scheme for the chromophore of FIG. 9A.

Referring to FIG. 9B, an exemplary preferred method for synthesizing the chromophore incorporating bithiophene units is illustrated. The exemplary preferred method for synthesis is described below.

3,3',5,5'-Tetrabromo-2,2'-bithiophene

Bromine (41.2 g, 257.8 mmol) was added dropwise to a solution of 2,2'-bithiophene (10 g, 60.2 mol) in 250 ml of chloroform at 0–5° C. A light-yellow solid was formed gradually during the addition. The mixture was stirred at room temperature overnight and then refluxed for 2 h. After cooling to room temperature, 100 ml of 10% KOH aqueous solution was added. The resulting mixture was extracted with chloroform to give the crude product. Recrystallization from ethanol/CHCl$_3$ (1:1) afforded a light-yellow crystal in the yield of 87% (25.1 g). $^1$H-NMR (CDCl$_3$, ppm): δ7.05 (s, 2H).

3,3'-Dibromo-2,2'-bithiophene

A mixture of 3,3',5,5'-tetrabromo-2,2'-bithiophene (25 g, 52.3 mmol), ethanol (50 ml), water (50 ml) and glacial acetic acid (100 ml) was heated to reflux. Then the heating oil bath was removed, and zinc powder (13.1 g, 200 mmol) was added in portions at such a rate that the mixture continued to reflux. After the addition was complete, heating was continued, the mixture was refluxed for another 5 h and cooled down to room temperature. The unreacted zinc powder was filtered off and the filtrate was collected, diluted with diethyl ether and then washed twice with water. The ether solution was dried with anhydrous MgSO$_4$ and the solvent was evaporated under reduced pressure. The crude product was recrystallized from hexane to afford a greenish crystal in the yield of 91% (15.3 g). $^1$H-NMR (CDCl$_3$, ppm): δ7.40 (d, 2H, J=5 Hz), 7.11 (d, 2H, J=5 Hz).

3,3'-Dihexyl-2,2'-bithiophene

Hexylmagnesium bromide (100 ml, 2 M solution in diethyl ether, 200 mol) was added dropwise to a solution of 3,3'-dibromo-2,2'-bithiophene (15 g, 46.6 mmol) and Ni(dppp)Cl$_2$ (0.5 g, 0.1 mmol) in 100 ml of diethyl ether at 0° C. The reaction was slightly exothermic and a red brown coloration was observed. After stirred and heated for 24 h, the reaction mixture was cautiously poured into a mixture of crushed ice and diluted HCl solution and extracted with ether. The combined extracts were dried over anhydrous MgSO$_4$ and filtered. After removal of the solvent, the residue was vacuum-distilled to give a clear viscous oil (15.6 g, 81%). $^1$H-NMR (CDCl$_3$, ppm): δ7.25 (d, 2H, J=5 Hz), 6.96 (d, 2H, J=5 Hz), 2.50 (t, 4H), 1.54 (m, 4H), 1.23 (m, 12H), 0.85 (t, 6H).

5-(3,3'-Dihexyl-2,2'-bithienyl)methylphosphonate

A solution of 3,3'-dihexyl-2,2'-bithiophene (8 g, 24 mmol) in 80 ml of anhydrous THF was added over 45 min under argon at −78° C. to a stirred solution of n-butyllithium (9.6 ml, 2.5 M in hexanes, 24 mmol) in 150 ml of THF. The solution was stirred for 45 min at −78° C., and then transferred, via cannula, into a flask cooled to −20° C. in a dry ice/CCl$_4$ bath, containing CuI (4.6 g, 24 mmol). After 2 h, diethyl iodomethylphosphonate (6.7 g, 24 mmol) was added in one portion, and the solution was reacted at room temperature overnight. The dark reaction mixture was poured into 300 ml of ether and 200 ml of water, and the organic layer washed successively with 3×200 ml water, 1×200 ml 5% aqueous NaHCO$_3$, 2×200 ml water, and 2×200 ml saturated brine solution. The organic layer was dried (MgSO$_4$), and evaporated. The resulting residue was purified by column chromatography packed with silica gel (1:1 hexanes:ethyl acetate), affording a clear yellow viscous oil (7.2 g, 62%). $^1$H-NMR (CDCl$_3$, ppm): δ7.26 (d, 1H, J=5 Hz), 6.96 (d, 1H, J=5 Hz), 6.88 (d, 1H, J=3.2 Hz), 4.12 (m, 4H), 3.34 (d, 2H, J=20.5 Hz), 2.47 (m, 4H), 1.52 (m, 4H), 1.31 (t, 6H), 1.24 (m, 12H), 0.86 (t, 6H).

5-(5'-Bromo-3,3'-dihexyl-2,2'-bithienyl) methylphosphonate

A solution of 5-(3,3'-dihexyl-2,2'-bithienyl) methylphosphonate (7 g, 14.5 mmol) and NBS (2.8 g, 15.7 mmol) in 150 ml of dichloromethane was stirred at 0° C. for 1 h and at room temperature for 2 h. Then the mixture was washed with 100 ml of 10% KOH aqueous solution and then with water until the solution was neutral. The organic layer was concentrated to give the crude product (7.8 g, 96%). $^1$H-NMR (CDCl$_3$, ppm): δ6.90 (s, 1H), 6.84 (d, 1H, J=5 Hz), 4.10 (m, 4H), 3.30 (d, 2H, J=20.5 Hz), 2.43 (m, 4H), 1.50 (m, 4H), 1.29 (t, 6H), 1.22 (m, 12H), 0.85 (t, 6H)

5-[E-4-(N,N-Diethylamino)phenylene]-5'-bromo-3,3'-dihexyl-2,2'-bithiophene

To a solution of 5-(5'-bromo-3,3'-dihexyl-2,2'-bithienyl) methylphosphonate (7.5 g, 13.3 mmol) and potassium t-butoxide (1.7 g, 14.6 mmol) in 100 ml of THF was added 4-(diethylamino)benzaldehyde (2.4 g, 13.3 mmol) in 20 ml of THF at 0° C. during 30 min. This is stirred for 4 h and normal workup gave a yellow viscous oil (7.0 g, 90%). $^1$H-NMR (CDCl$_3$, ppm): δ7.32 (d, 2H, J=5 Hz), 6.90 (d, 1H, J=7.5 Hz), 6.85 (s, 1H), 6.80 (s, 1H), 6.78 (d, 1H, J=7.5 Hz), 6.67 (d, 2H, J=5 Hz), 3.41 (q, 4H), 2.50 (t, 2H), 2.41 (t, 2H), 1.50 (m, 4H), 1.21 (m, 12H), 1.17 (t, 6H), 0.87 (t, 6H).

5-[E-4-(N,N-Diethylamino)phenylene]-5'-formyl-3,3'-dihexyl-2,2'-bithiophene n-Butyllithium (12 ml, 2.5 M in hexanes, 30 mmol) was added dropwise to a solution of 5-[E-4-(N,N-diethylamino)phenylene]-5'-bromo-3,3'-dihexyl-2,2'-bithiophene (7 g, 12 mmol) in 80 ml of THF over 15 min at −78° C. Then the reaction mixture was allowed to gradually rise to −20° C. and 5 ml of anhydrous DMF was added. After the mixture was stirred for 3 h, 50 ml of 1N HCl was added dropwise to terminate the reaction. The normal workup was then carried out and the crude product was purified by column chromatography over silica gel, eluting with ethyl acetate/hexane (1:5) to afford a yellow viscous oil (5.7 g, 89%). $^1$H-NMR (CDCl$_3$, ppm): δ9.85 (s, 1H), 7.64 (s, 1H), 7.31 (d, 2H, J=5 Hz), 6.96 (d, 1H, J=7.5 Hz), 6.90 (s, 1H), 6.79 (d, 1H, J=7.5 Hz), 6.50 (d, 2H, J=5 Hz), 3.36 (q, 4H), 2.61 (t, 2H), 2.50 (t, 2H), 1.55 (m, 4H), 1.26 (m, 12H), 1.17 (t, 6H), 0.85 (t, 6H).

2-Dicyanomethylen-3-cyano-4-{5-[E-(4-N,N-diethylamino)phenylene-3,3'-dihexyl-2,2'-bithien-5']-E-vinyl}-5,5-dimethyl-2,5-dihydrofuran (Chromophore)

To a solution of sodium ethoxide (0.8 ml, 21 wt % solution in ethanol) in 100 ml of ethanol was added 5-[E-4-(N,N-diethylamino)phenylene]-5'-formyl-3,3'-dihexyl-2,2'-bithiophene (5.7 g, 10.6 mmol) and 2-dicyanomethylen-3-cyano-4,5,5-trimethyl-2,5-dihydrofuran (2.6 g, 13.1 mmol). The reaction mixture was stirred and refluxed for 6 h. When TLC indicated that the reaction was almost complete, the mixture was cautiously poured into water and kept at 0° C. overnight. The crystalline precipitate was recrystallized from ethanol to give shiny crystals of the chromophore (5.5 g, 72%). $^1$H-NMR (CDCl$_3$, ppm): δ7.80 (d, 2H, J=12.5 Hz), 7.40 (s, 1H), 7.34 (d, 1H, J=8 Hz), 6.95 (d, 1H, J=12.5 Hz), 6.88 (s, 1H), 6.82 (d, 1H, J=12.5 Hz), 6.65 (d, 1H, J=8 Hz), 6.53 (d, 2H, J=12.5 Hz), 3.38 (q, 4H), 2.62 (t, 2H), 2.55 (t, 2H), 1.76 (s, 6H), 1.57 (m, 4H), 1.27 (m, 12H), 1.18 (t, 6H), 0.87 (t, 6H).

Figure 10:
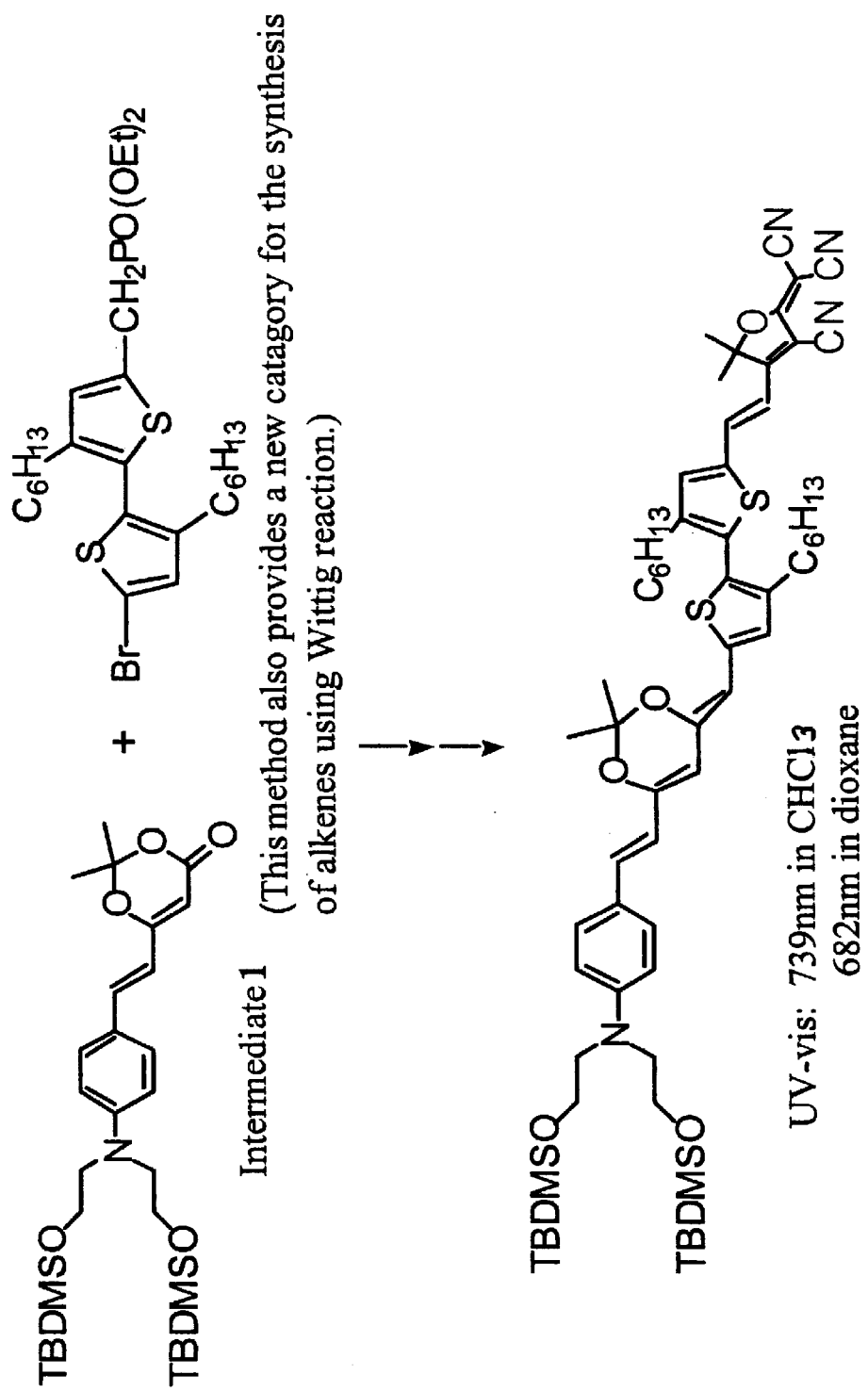
FIG. 10 illustrates an exemplary preferred method of bridge modification by bithiophene insertion and isophorone modification according to the present invention.

Referring to FIG. 10, a representative bridge modification by bithiophene insertion and dimethyldioxine ring modification is illustrated. The resulting chromophore has an much improved $r_{33}$ of 95 pm/V at 1.06 μm.

Several exemplary preferred ring-locked tricyano electron acceptor groups are illustrated in FIG. 11. In FIG. 11, $R_1$ to $R_9$=H, —$C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

The five-membered-ring-locked tricyano acceptor (cyanofuran acceptor, TCF in FIG. 11) has been modified to further increase electro-optic activity and chromophore stability. According the present invention, a large number of atoms and organic groups (e.g., carbonyl) have been used in place of the furan oxygen in the electron acceptor group leading to improved electrooptic and optical properties. Six-membered-ring-locked analogs (TCP) have also been developed. The oxygen atom of the furan ring and the pyran ring (in TCF and TCP) is replaced by a methylene moiety to produce the desired effect of blue shifting the optical absorption spectrum leading to lower optical loss for some electrooptic applications.

Figure 12:
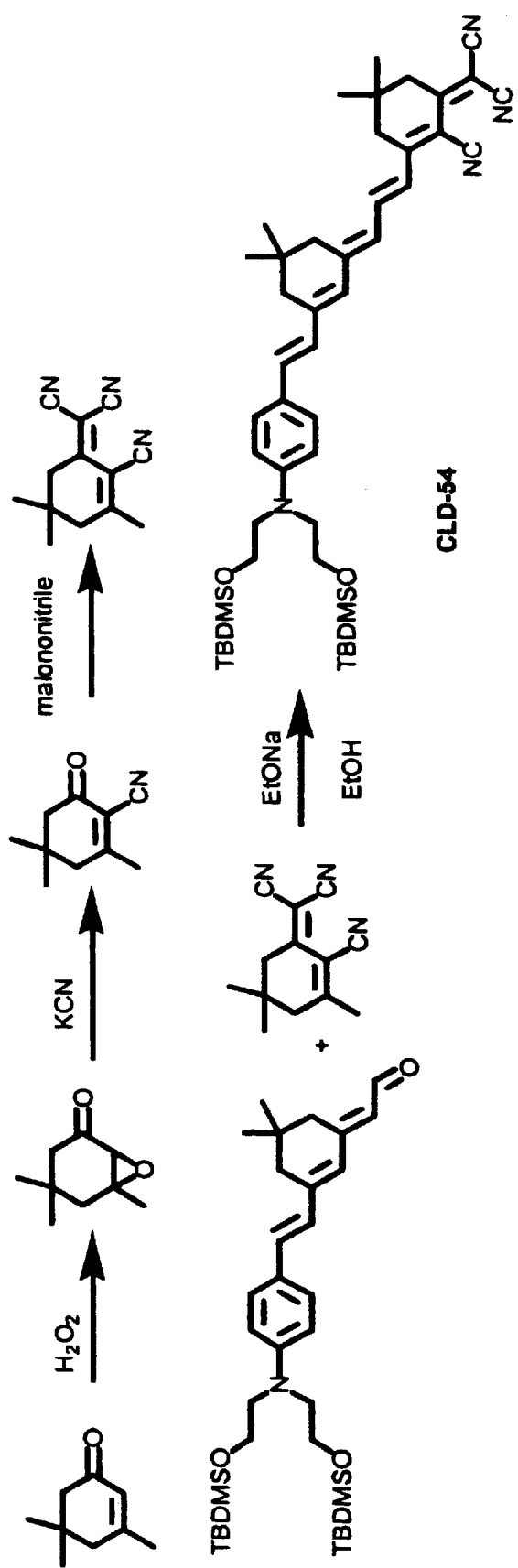
FIG. 12 illustrates a version of CLD chromophore according to the present invention where the cyanofuran acceptor has been modified by replacement of the furan oxygen atom with a isophorone structure.

Referring to FIG. 12, a modified version of CLD is shown where the cyanofuran acceptor has been modified by replacement of the furan ring with an isophorone ring structure. This has the desired effect of blue shifting the optical absorption spectrum leading to lower optical loss for some electrooptic applications.

Synthesis of Chromophore with Isophorone Structure in Electron Acceptor Group To a mixture of isophorone (400 g), EtOH (1000 ml), NaOH (20 g) and water (30 ml) was added 1.2 eq, 3.473 mol, 394.76 g of 30% $H_2O_2$ in portions at RT. After 4 hour of stirring, the mixture was neutralized with dilute acetic acid and extracted with diethyl ether. The extract was dried over MgSO4, condensed via rotary evaporation. The crude product was used in the next reaction without purification.

To a solution of the above crude product in 500 ml EtOH was added a solution of 2.89 mol, 108 g KCN/150 g water in portions over 0.5 h. The mixture was refluxed for 1 h. Rotovap at 60° C. to remove EtOH. The residue was neutralized with 6N hydrochlorix acid. The product was collected by filtration. The crude product was purified with column chromatography using 4/1 hexanes/EtOAc as eluent to give 180 g pure product.

TCI (2-cyano-3-dicyanomethylene-1,5,5-dimethylcyclohexene): A mixture of 2-cyanoisophorone (14.19 g, 86.9 mmol), malononitrile (6.89 g), EtOH (15 ml) and EtONa (100 mmol, 6.88 g) was heated in 80–90 C. bath for 1 h. The mixture was poured water, neutralized with acetic acid and extracted with ethyl acetate. The extract was condensed and purified with silica gel column chromatography. Recrystallization of the product from EtOAc/hexane gave gray crystals with mp of 103.5–105.5. Elemental analysis: calcd. C, 73.91; H, 6.20; N, 19.89; found C, 73.93; H, 6.26; N 19.97.

The chromophore (CLD-54) was synthesized in a manner similar to the synthesis of chromophore CLD-1 in FIG. 2. UV-vis aborption: 600 nm in dioxane, 663 nm in chloroform.

Referring to FIG. 13, alternative donor structures for the FTC, CLD, GLD and ZLD chromophores are illustrated. It has been observed that chromophores of the FTC, CLD, GLD and ZLD type have been systematically improved by the utilization of the new donor structures which provide improved electrooptic activity as the result of an improved inductive (electron donating) effect and through better overlap of π-electron orbitals due to steric and resonance effects. Exemplary FTC chromophore structures with modified donor structures are illustrated in FIGS. 14A and 14B. All of these structures have been incorporated into a variety of polymer lattices. In FIG. 13, $R_1$ to $R_2$=H, —$C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

Preparation of a Polyester Containing CLD-5 Chromophore

Figure 15:
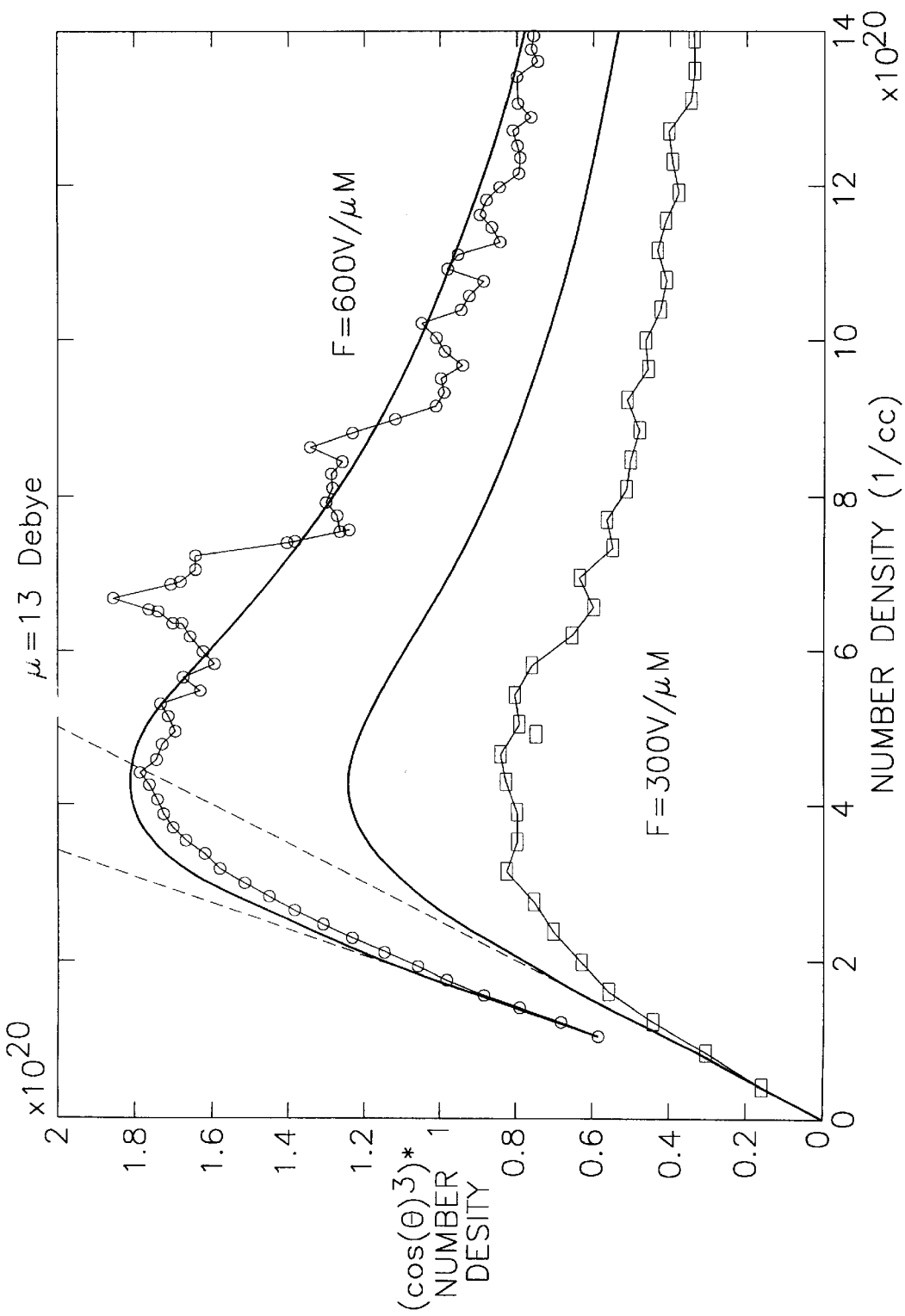
FIG. 15 illustrates the preparation of an exemplary preferred CLD-containing polyester polymer according to the present invention.

All chromophores functionalized with reactive groups have been incorporated into a variety of polymer lattices by reacting them with various polymerization and polymerization coupling reagents. Such structures exhibit excellent thermal stability (i.e., no loss of electrooptic activity to greater than 100° C.). The preparation of a polyester containing CLD-5 chromophore is illustrated in FIG. 15 and discussed below.

Preparation of 19.6 wt % CLD-5 Loaded Polyester

In dry box, a mixture of 0.4 mmol of terephthaloyl dichloride, 0.0838 mmol CLD-5, 2 ml THF and 0.1 mmol of triethylamine was stirred at 30° C. for 10 h. Then 0.366 mmol of isopropylidenediphenol and 0.69 mmol of triethylamine were added. Stirring was continued for 26 h later and the mixture was precipitated from MeOH. The polymer was dissolved in methylene chloride and reprecipitated by dropping the solution into methanol. The product was collected by filtration and dried in vacuo.

Figure 16:
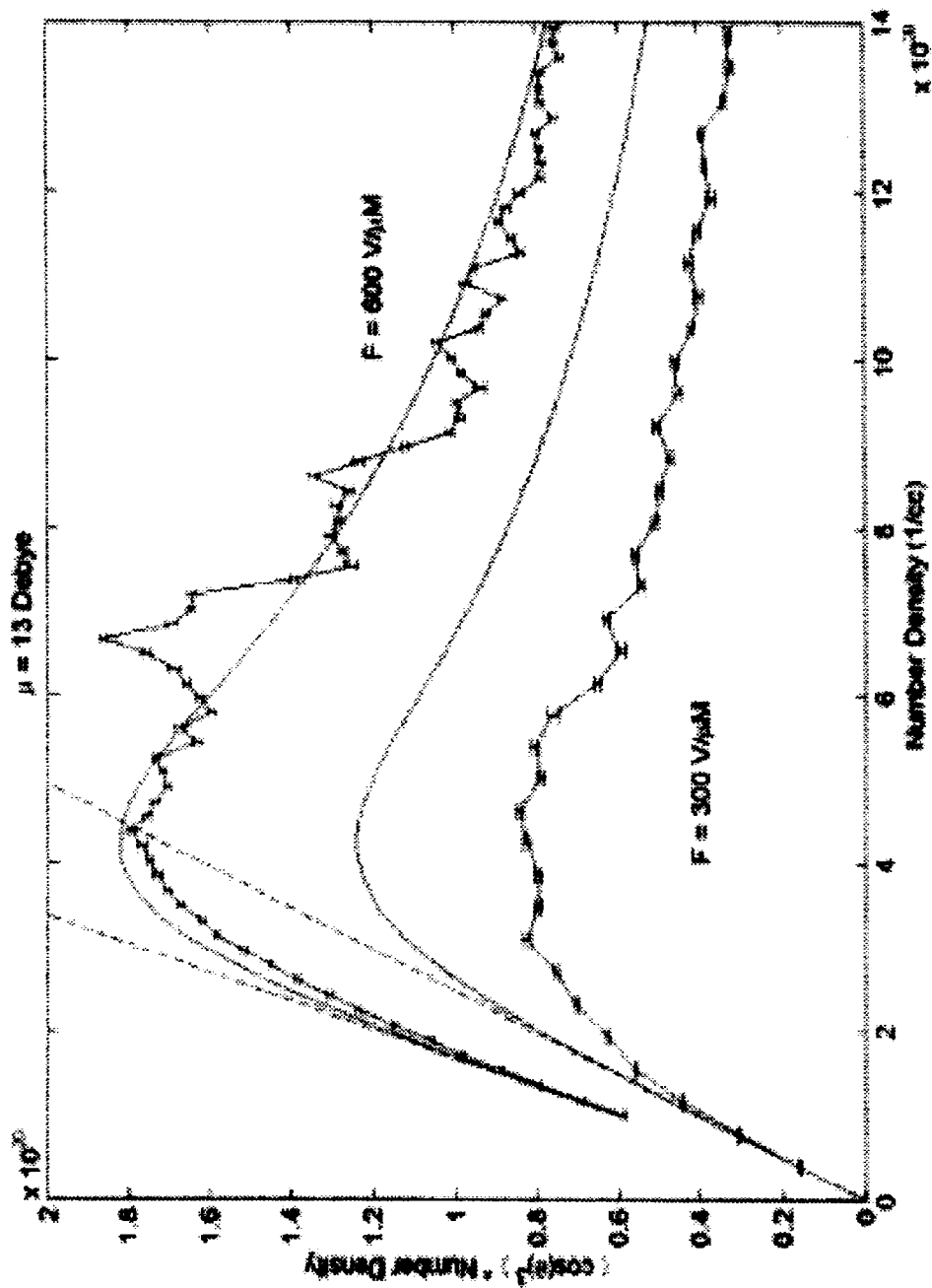
FIG. 16 illustrates the variation of electrooptic activity (divided by molecular polarizability) versus chromophore concentration in the polymer lattice for two values of the electric poling field.

Continued improvement in theoretical tools used to guide the design of improved electrooptic materials has also been made. Monte Carlo Molecular Dynamical Methods as well as equilibrium statistical mechanical methods have been developed to guide the design of improved materials. As shown in FIG. 16, these various methods give comparable results. More specifically, a comparison of equilibrium and molecular dynamical (Monte Carlo) calculations is provided. The solid lines are the equilibrium statistical mechanical results while the Monte Carlo results are given by connected dots. The variation of electrooptic activity (divided by molecular polarizability) versus chromophore concentration in the polymer lattice is given for two values of the electric poling field. For the lower field value, the Monte Carlo results are displaced downward to make comparison of the functional dependence more easily visualized.

The organic chromophores of the present invention exhibit exceptional molecular optical nonlinearity, thermal stability, and low optical absorption at telecommunication wavelengths. The chromophore materials of the present invention are suitable for processing into hardened polymers for electrooptic devices employing protocols previously developed for other chromophores. The materials are fully amenable to all processing steps necessary for the fabrication of such devices.

Figure 17:
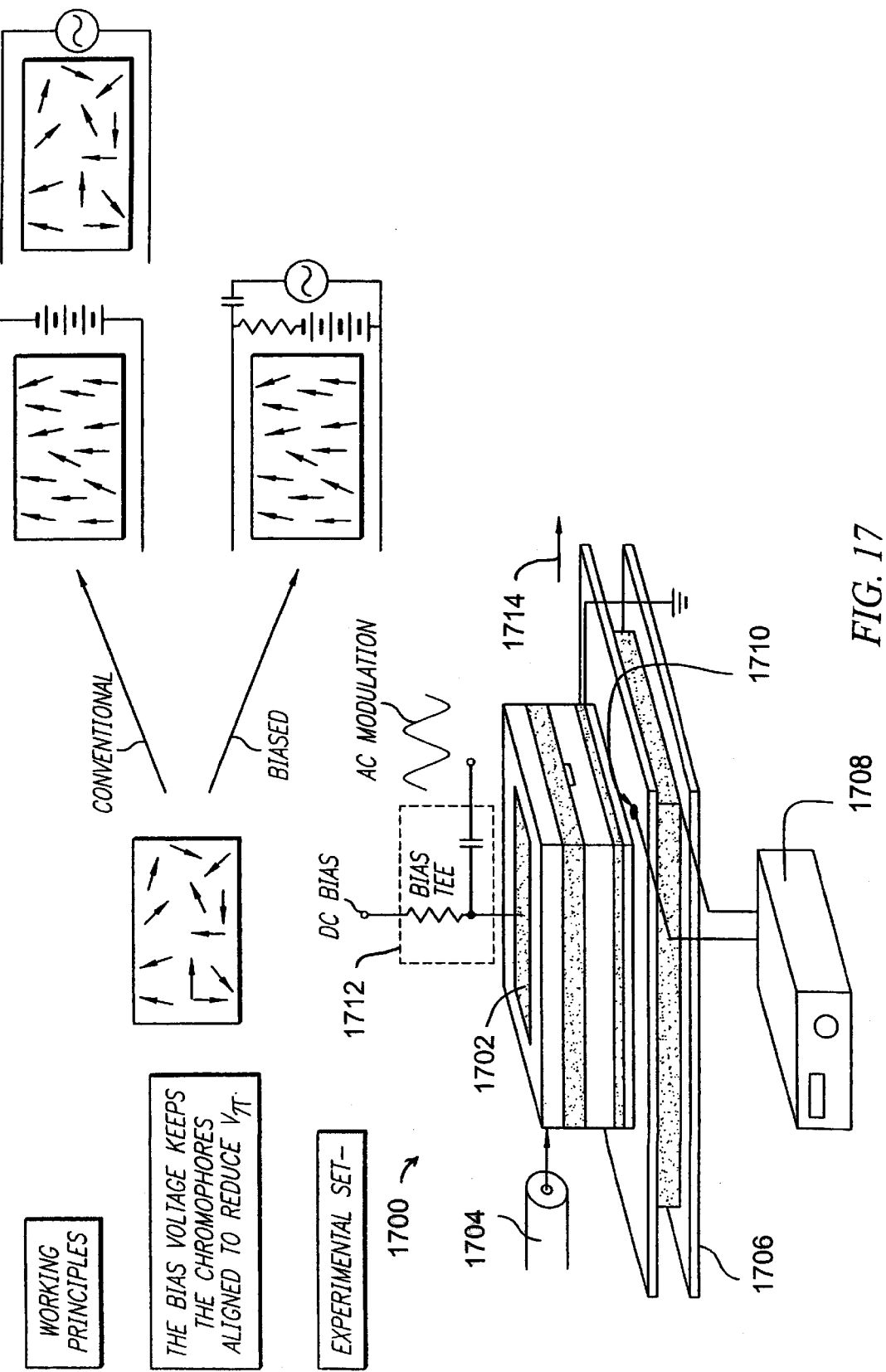
FIG. 17 illustrates an exemplary preferred electrooptic device employing a constant electric field bias, the device incorporating a chromophore material the present invention.

According to the present invention, these materials can be employed not only in conventional electrooptic modulator device configurations but also in devices employing a constant bias field which permits the full potential of the materials to be demonstrated. Referring to FIG. 17, an exemplary preferred electrooptic device 1700 employing a constant electric field bias is illustrated. The illustrated electrooptic device 1700 includes a modulator chip 1702, a fiber 1704, a thermoelectric cooler 1706, a temperature controller 1708, a thermister 1710, and a bias tee 1712 (including a resistor and a capacitor) configured as shown providing a light output indicated by arrow 1714.

Figure 18:
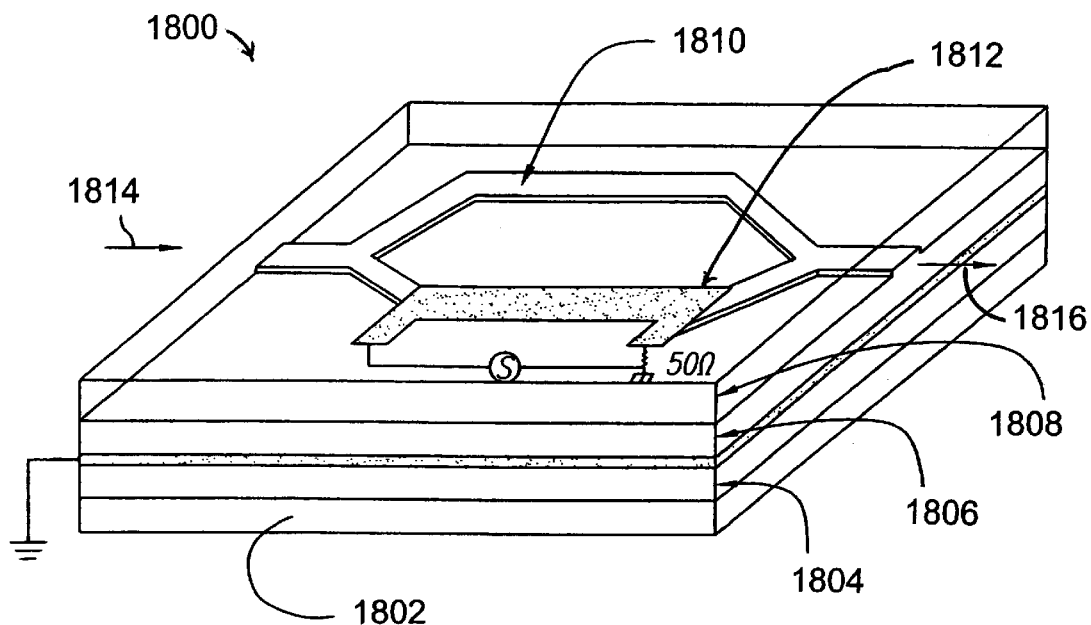
FIG. 18 illustrates an exemplary preferred Mach Zehnder modulator incorporating a chromophore material of the present invention.

Referring to FIG. 18, an exemplary preferred Mach Zehnder modulator 1800 incorporating a chromophore material of the present invention is illustrated. The illustrated modulator 1800 includes a Si substrate 1802, an Epoxylite (3 µm) layer 1804, a PU-chromophore (1.5 µm) layer 1806, a NOA73 (3.5 µm) layer 1808, a waveguide 1810 and an electrode 1812 configured as shown with light indicated by arrows 1814, 1816.

Figure 19:
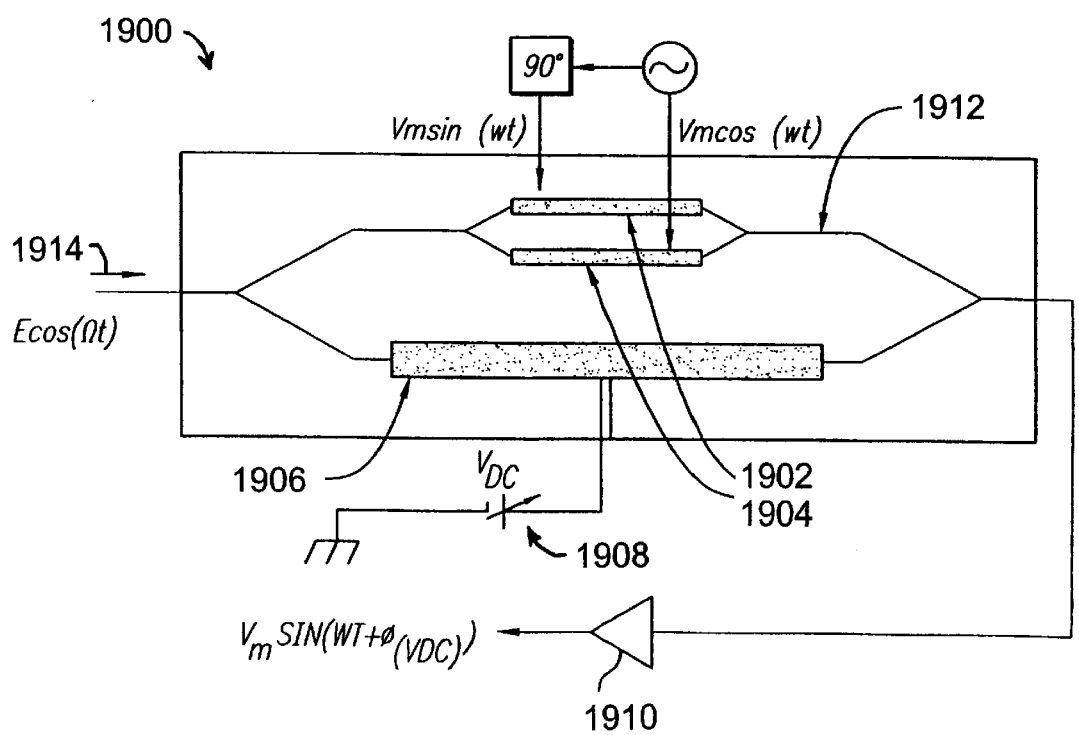
FIG. 19 illustrates the use of a chromophore material of the present invention (in the form of microstrip lines) in a microwave phase shifter of the type employed in optically controlled phased array radars.

Referring to FIG. 19, the materials of the present invention are shown in the form of microstrip lines in an exemplary preferred microwave phase shifter 1900 of the type employed in optically controlled phase array radars. The illustrated microwave phase shifter 1900 includes microstrip lines 1902, 1904, a DC control electrode 1906, a DC source 1908, a photodetector 1910 and an optical waveguide 1912 configured as shown with light indicated by arrow 1914.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

We claim:
1. A nonlinear optical device comprising:

an active element including a chromophore formed as:

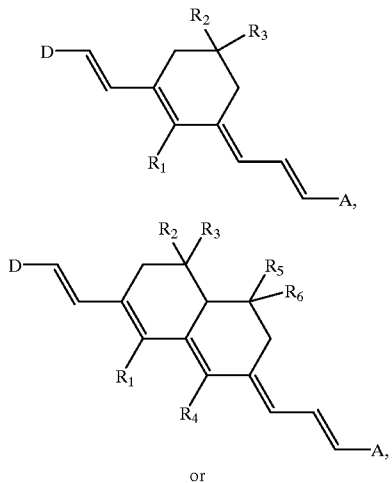

or

-continued

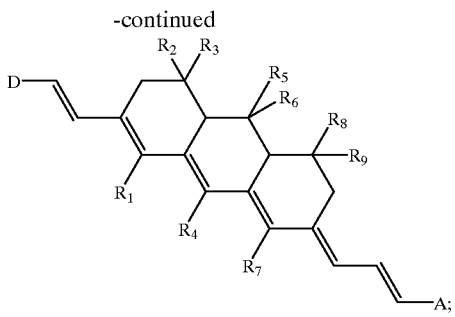

wherein D is an electron donor group;

wherein A is an electron acceptor group;

wherein $R_1$ to $R_9$=H, $-C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

2. A nonlinear optical device comprising:
an active element formed from a chromophore including
an electron donor group,
an electron acceptor group, and
a bridge structure between the electron donor group and the electron acceptor group, the bridge structure including an alicyclic ring;
wherein the electron acceptor group is connected to the bridge structure with a conjugated diene.

3. The nonlinear optical device of claim 2 wherein the bridge structure includes at least one side group.

4. The nonlinear optical device of claim 2 wherein the chromophore is formed in a polymer matrix.

5. A nonlinear optical device comprising:
an active element formed from a chromophore including
an electron donor group (D),
an electron acceptor group (A), and
a ring-locked bridge structure between the electron donor group and the electron acceptor group;
wherein the ring-locked bridge structure is formed as

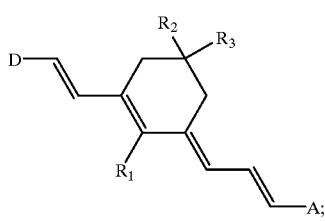

wherein $R_1$ to $R_3$=H, $-C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

6. The nonlinear optical device of claim 5 wherein the chromophore is formed in a polymer matrix.

7. A nonlinear optical device comprising:
an active element formed from a chromophore including
an electron donor group (D),
an electron acceptor group (A), and
a ring-locked bridge structure between the electron donor group and the electron acceptor group;
wherein the ring-locked bridge structure is formed as

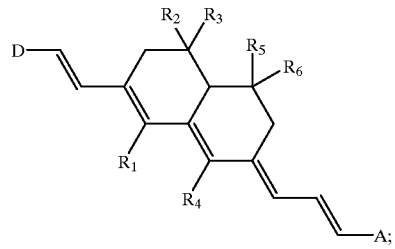

wherein $R_1$ to $R_6$=H, $-C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

8. The nonlinear optical device of claim 7 wherein the chromophore is formed in a polymer matrix.

9. A nonlinear optical device comprising:
an active element formed from a chromophore including
an electron donor group (D),
an electron acceptor group (A), and
a ring-locked bridge structure between the electron donor group and the electron acceptor group;
wherein the ring-locked bridge structure is formed as

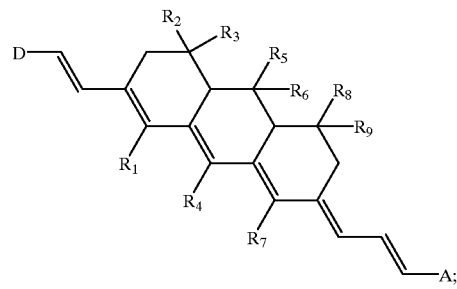

wherein $R_1$ to $R_9$=H, $-C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

10. The nonlinear optical device of claim 9 wherein the chromophore is formed in a polymer matrix.

11. A nonlinear optical device comprising:
an active element formed from a chromophore including
an electron donor group,
a ring-locked tricyano electron acceptor group, and
a bridge structure between the electron donor group and the ring-locked tricyano electron acceptor group.

12. The nonlinear optical device of claim 11 wherein the ring-locked tricyano electron acceptor group is connected to the bridge structure with a conjugated diene.

13. The nonlinear optical device of claim 11 wherein the ring-locked tricyano electron acceptor group comprises an isophorone structure.

14. The nonlinear optical device of claim 11 wherein the bridge structure comprises a fused ring system.

15. The nonlinear optical device of claim 11 wherein the chromophore is formed in a polymer matrix.

16. The nonlinear optical device of claim 11 wherein the ring-locked tricyano electron acceptor group comprises:

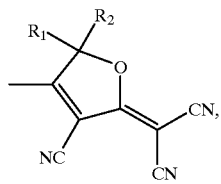

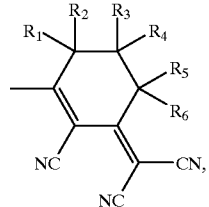

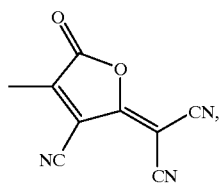

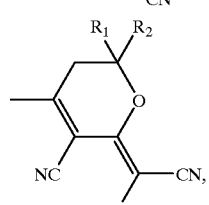

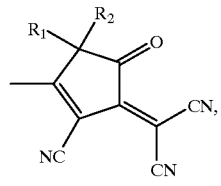

or

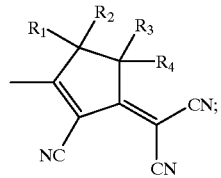

wherein $R_1$ to $R_6$=H, —$C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

17. A nonlinear optical device comprising:

an active element formed from a chromophore including
an electron donor group,
an electron acceptor group, and
a bridge structure between the electron donor group and the electron acceptor group, the bridge structure including a bithiophene unit formed as

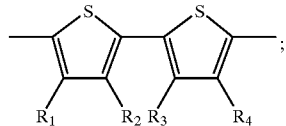

wherein $R_1$ to $R_4$=H, —$C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy;

wherein the bridge structure further includes a 1,3-dioxin derivative formed as

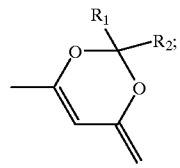

wherein $R_1$, and $R_2$=H, —$C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy.

18. A nonlinear optical device comprising:

an active element formed from a chromophore including
an electron donor group,
an electron acceptor group, and
a bridge structure between the electron donor group and the electron acceptor group, the bridge structure including a bithiophene unit formed as

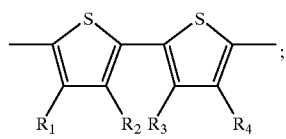

wherein $R_1$ to $R_4$=H, —$C_nH_{2n+1}$, n=1–30 including primary, secondary, tertiary and any branched alkyl groups, or any alkyl group with 1–30 carbon atoms functionalized with one or more of the following functional groups: hydroxy, ether, ester, amino, silyl, siloxy;

wherein the electron acceptor group comprises a tricyano electron acceptor group comprising:

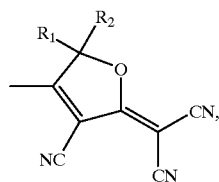

-continued

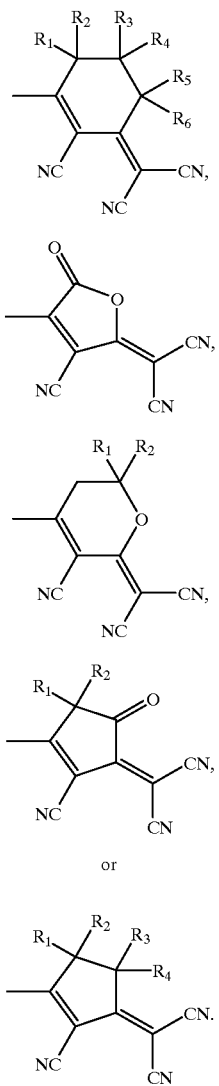

19. The nonlinear optical device of claim 17 wherein the chromophore is formed in a polymer matrix.

20. A nonlinear optical device comprising:
an active element including a chromophore formed as:

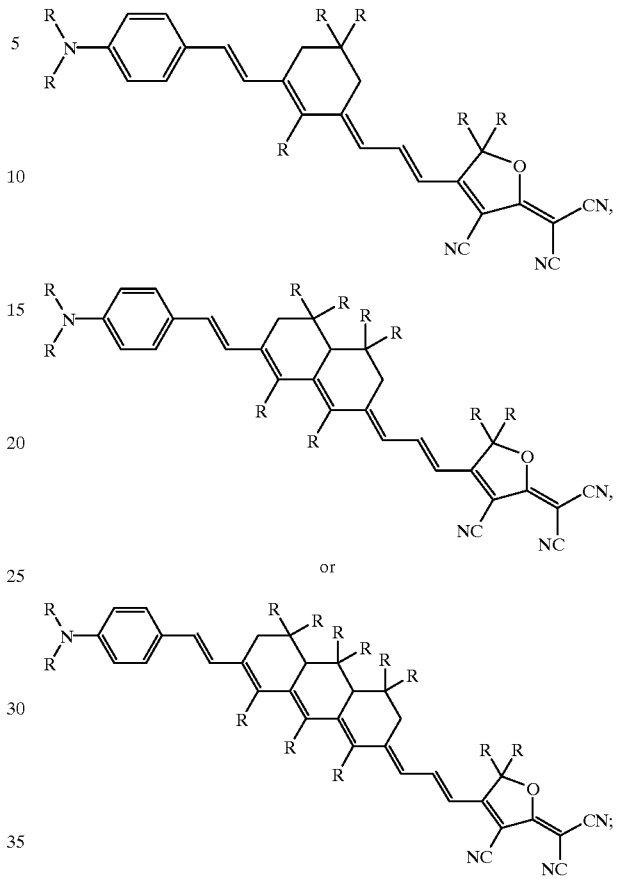

wherein R groups are independently selected from H, or any perhalogenated, halogenated or non-halogenated aliphatic or aromatic group with 1–30 carbon atoms functionalized with zero or more of the following functional groups: hydroxy, ether, ester, amino, silyl, and siloxy.

21. The nonlinear optical device of claim 18 wherein the chromophore is formed in a polymer matrix.

* * * * *